(12) United States Patent
Kinashi et al.

(10) Patent No.: US 12,194,382 B2
(45) Date of Patent: Jan. 14, 2025

(54) STORAGE MEDIUM STORING GAME PROGRAM, GAME SYSTEM, GAME APPARATUS, AND GAME PROCESSING METHOD

(71) Applicants: Nintendo Co., Ltd., Kyoto (JP); The Pokémon Company, Tokyo (JP)

(72) Inventors: Akira Kinashi, Kyoto (JP); Junichi Masuda, Tokyo (JP); Yuichi Ueda, Tokyo (JP)

(73) Assignees: Nintendo Co., Ltd., Kyoto (JP); The Pokémon Company, Tokyo (JP)

( * ) Notice: Subject to any disclaimer, the term of this patent is extended or adjusted under 35 U.S.C. 154(b) by 242 days.

(21) Appl. No.: 17/882,634

(22) Filed: Aug. 8, 2022

(65) Prior Publication Data
US 2023/0097998 A1 Mar. 30, 2023

(30) Foreign Application Priority Data
Sep. 27, 2021 (JP) ................ 2021-156526

(51) Int. Cl.
*A63F 13/00* (2014.01)
*A63F 13/533* (2014.01)
*A63F 13/795* (2014.01)

(52) U.S. Cl.
CPC .......... *A63F 13/533* (2014.09); *A63F 13/795* (2014.09)

(58) Field of Classification Search
CPC ........... A63F 13/79; A63F 13/87; A63F 13/69
See application file for complete search history.

(56) References Cited

U.S. PATENT DOCUMENTS

| 2008/0004116 A1* | 1/2008 | Van Luchene | G07F 17/32 |
| | | | 463/42 |
| 2013/0084995 A1 | 4/2013 | Yamaguchi | |
| 2015/0148133 A1* | 5/2015 | Harp | A63F 13/00 |
| | | | 463/31 |

FOREIGN PATENT DOCUMENTS

| JP | 2002-210256 A | 7/2002 |
| JP | 2006-141702 | 6/2006 |
| JP | 2013-078380 | 5/2013 |
| JP | 2018-068766 | 5/2018 |
| JP | 2019-177089 | 10/2019 |

\* cited by examiner

*Primary Examiner* — David L Lewis
*Assistant Examiner* — Eric M Thomas
(74) *Attorney, Agent, or Firm* — Nixon & Vanderhye PC

(57) ABSTRACT

A place designated by a player on a user interface is set according to an operation input. An item or character that the player is to transmit to another information processing apparatus for exchange is designated according to an operation input. In the exchange, information about the place and information about the item or character are transmitted as information about a thing to be exchanged to the another information processing apparatus. Information about the place designated by an exchanging partner and information about the item or character designated by the exchanging partner are received as information about a thing to be exchanged from the another information processing apparatus. The item or character that has been obtained as the thing to be exchanged from the exchanging partner by the exchange, is displayed on the user interface at the place designated by the exchanging partner.

39 Claims, 23 Drawing Sheets

STORAGE MEDIUM STORING GAME PROGRAM, GAME SYSTEM, GAME APPARATUS, AND GAME PROCESSING METHOD

CROSS-REFERENCE TO RELATED APPLICATION

This application claims priority to Japanese Patent Application No. 2021-156526, filed on Sep. 27, 2021, the entire contents of which are incorporated herein by reference.

FIELD

The technology disclosed herein relates to game program-storing storage media, game systems, game apparatuses, and game processing methods for performing an exchange process according to an operation input.

BACKGROUND AND SUMMARY

There is a conventional video game system in which an attribute of an item or character is changed based on a history of exchange of the item or character between game apparatuses.

However, in the above video game system, a thing to be exchanged is specified by the type and attribute of an item or character, i.e., information about the thing to be exchanged itself.

Therefore, it is an object of the present non-limiting example to provide a game program-storing storage medium, game system, game apparatus, and game processing method capable of providing an incentive to exchange items or characters by utilizing further additional information about a thing to be exchanged.

To achieve the object, the present non-limiting example may have the following features, for example.

In an exemplary configuration of a non-transitory computer-readable storage medium having stored therein an information processing program according to the exemplary embodiment, a non-transitory computer-readable storage medium having stored therein a game program that when executed by a computer of an information processing apparatus, causes the computer to communicate with another information processing apparatus and exchange items or characters used in a game with another player, and to perform operations including: setting a place designated by a player on a user interface according to an operation input; designating an item or character that the player is to transmit to the another information processing apparatus for the exchange, according to an operation input; in the exchange, transmitting, to the another information processing apparatus, information about the place designated by the player and information about the item or character designated by the player, as information about a thing to be exchanged, and receiving, from the another information processing apparatus, information about the place designated by an exchanging partner and information about the item or character designated by the exchanging partner, as information about a thing to be exchanged; and performing first user interface display in which at least one of the item or character that has been obtained as the thing to be exchanged from the exchanging partner by the exchange, is displayed on the user interface at the place designated by the exchanging partner, or displayed by choosing the place.

Thus, in the case of exchange of items or characters, when the items or characters are put up for exchange, a scene is displayed using information about a place designated by an exchanging partner. Therefore, the use of the further additional information can provide an incentive to exchange items or characters.

Further, the another information processing apparatus may be a server configured to store at least one of the transmitted information about a thing to be exchanged. The game program further causes the computer to perform operations comprising: communicating with the server to execute the exchange with the another player through the server.

Thus, the process of exchanging items or characters is executed through the server. This facilitates management of each exchange, and also allows global exchange.

Further, the game program further may cause the computer to perform operations including: in the exchange, receiving, from the server, a most recently stored one of the information about a thing to be exchanged that is stored in the server, as information about a thing to be exchanged of the exchanging partner.

Thus, information about a thing to be exchanged that is to be put up for exchange is most recently stored in the server, i.e., is information about a thing to be exchanged that has been newly and most recently stored in the server. Therefore, most recently stored information about a thing to be exchanged always exists in the server, which ensures exchange.

Further, the game program further may cause the computer to perform operations including: in the exchange, receiving, from the server, a randomly chosen one of the information about a thing to be exchanged that is stored in the server, as information about a thing to be exchanged of the exchanging partner.

Thus, an exchanging partner can be chosen at random, and can be easily set.

Further, the game program further may cause the computer to perform operations including: in the exchange, receiving, from the server, one of the information about a thing to be exchanged that is stored in the server, a place designated for the one being the same as the place designated by the player, as information about a thing to be exchanged of the exchanging partner.

Thus, exchange can be performed with an exchanging partner who designates a place that is desired by the player.

Further, the game program further may cause the computer to perform operations including: performing second user interface display in which each item or character that is stored as the information about a thing to be exchanged in the server and that has not yet been exchanged, is displayed at the respective place designated on the user interface, based on at least one of the information about a thing to be exchanged that is stored in the server.

Thus, a situation in which items or characters are put for exchange can be known, and can also be used as information that is used by the player to make an application for exchange.

Further, the game program further may cause the computer to perform operations including: giving a reward to the player in the game, based on the number of the places designated by the exchanging partner where the exchange has been done.

Thus, an incentive can be added to additional information obtained in exchange.

Further, the user interface may be a spherical user interface representing the earth in a virtual space. The game program further may cause the computer to perform operations including: setting a place designated by the player on the earth according to an operation input.

Thus, the player can have an image of global exchange.

Further, the user interface may be a spherical user interface representing the earth in a virtual space. The game program further may cause the computer to perform operations including: setting a place designated by the player specifying coordinates on the spherical user interface, according to an operation input.

Thus, the player can easily perform an operation of designating a place.

Further, the game program further may cause the computer to perform operations including: rotating the spherical user interface in a virtual space according to an operation input.

Thus, the spherical user interface is rotated so that places on the entire surface can be used. Therefore, the user interface can be effectively used, resulting in an improvement in convenience.

Further, the user interface may be a map. The game program further may cause the computer to perform operations including: setting a place designated by the player choosing an area on the map, according to an operation input.

Thus, the player can intuitively designate a place by utilizing the map.

The exemplary embodiment may be carried out in the forms of a game processing system, a game processing apparatus, and a game processing method.

In the case of implementation in the form of a game system as described above, the server may transmit information about a thing to be exchanged that has been most recently stored in the server to the information processing apparatus, and may newly store information about a thing to be exchanged that is transmitted from the information processing apparatus. In this case, in exchange, the server may transmit the information about a thing to be exchanged that has been most recently stored in the server to the information processing apparatus, and may delete that information therefrom.

Thus, information about a thing to be exchanged that is to be put up for exchange is newly and most recently stored in the server, and can be only one piece of information about a thing to be exchanged that is most recently stored in the server, which facilitates exchange.

According to the exemplary embodiment, further additional information is used in exchange of items or characters, which can provide an incentive to exchange items or characters.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

A game system according to the present non-limiting example will now be described. A non-limiting example of a game system 1 according to the present non-limiting example includes a main body apparatus (information processing apparatus serving as the main body of a game apparatus in the present non-limiting example) 2, a left controller 3, and a right controller 4. The left controller 3 and the right controller 4 are attachable to and detachable from the main body apparatus 2. That is, the user can attach the left controller 3 and the right controller 4 to the main body apparatus 2, and use them as a unified apparatus. The user can also use the main body apparatus 2 and the left controller 3 and the right controller 4 separately from each other (see FIG. 2). In the description that follows, a hardware configuration of the game system 1 of the present non-limiting example is described, and thereafter, the control of the game system 1 of the present non-limiting example is described.

Figure 1:
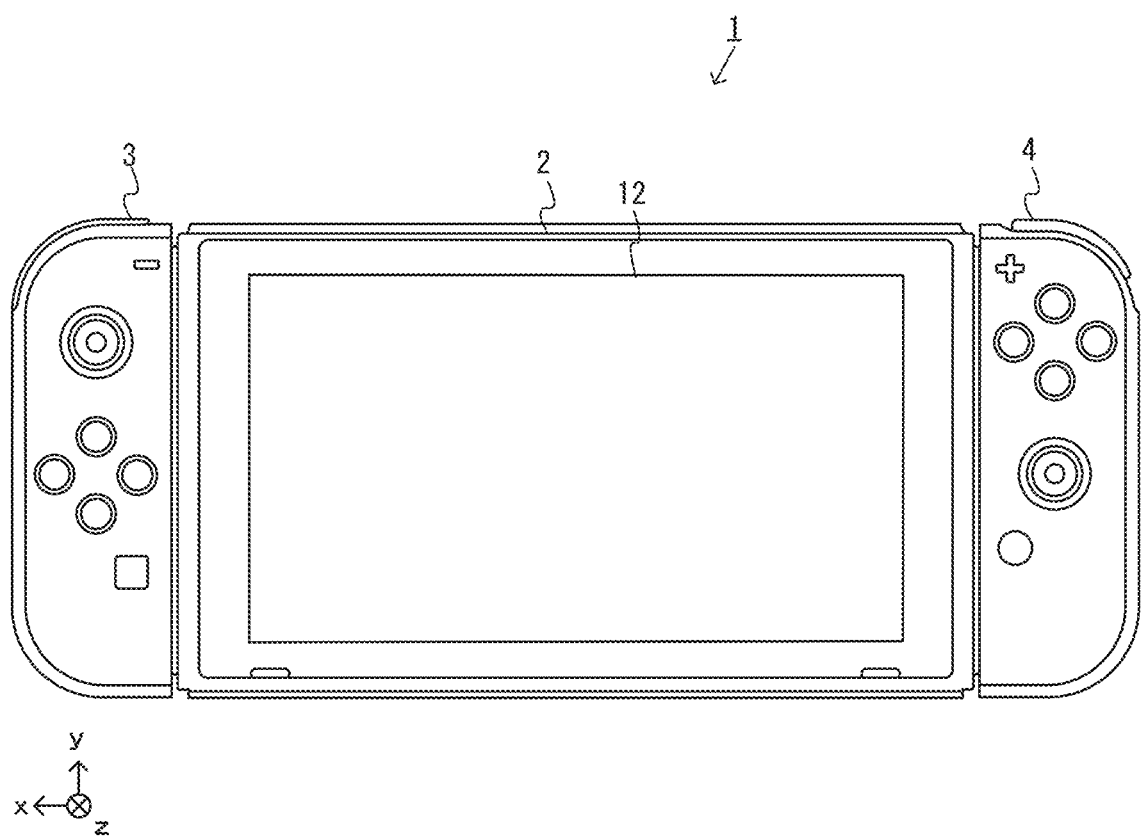
FIG. 1 is a diagram illustrating a non-limiting example of a state where a left controller 3 and a right controller 4 are attached to a main body apparatus 2.

FIG. 1 is a diagram illustrating a non-limiting example of the state where the left controller 3 and the right controller 4 are attached to the main body apparatus 2. As illustrated in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
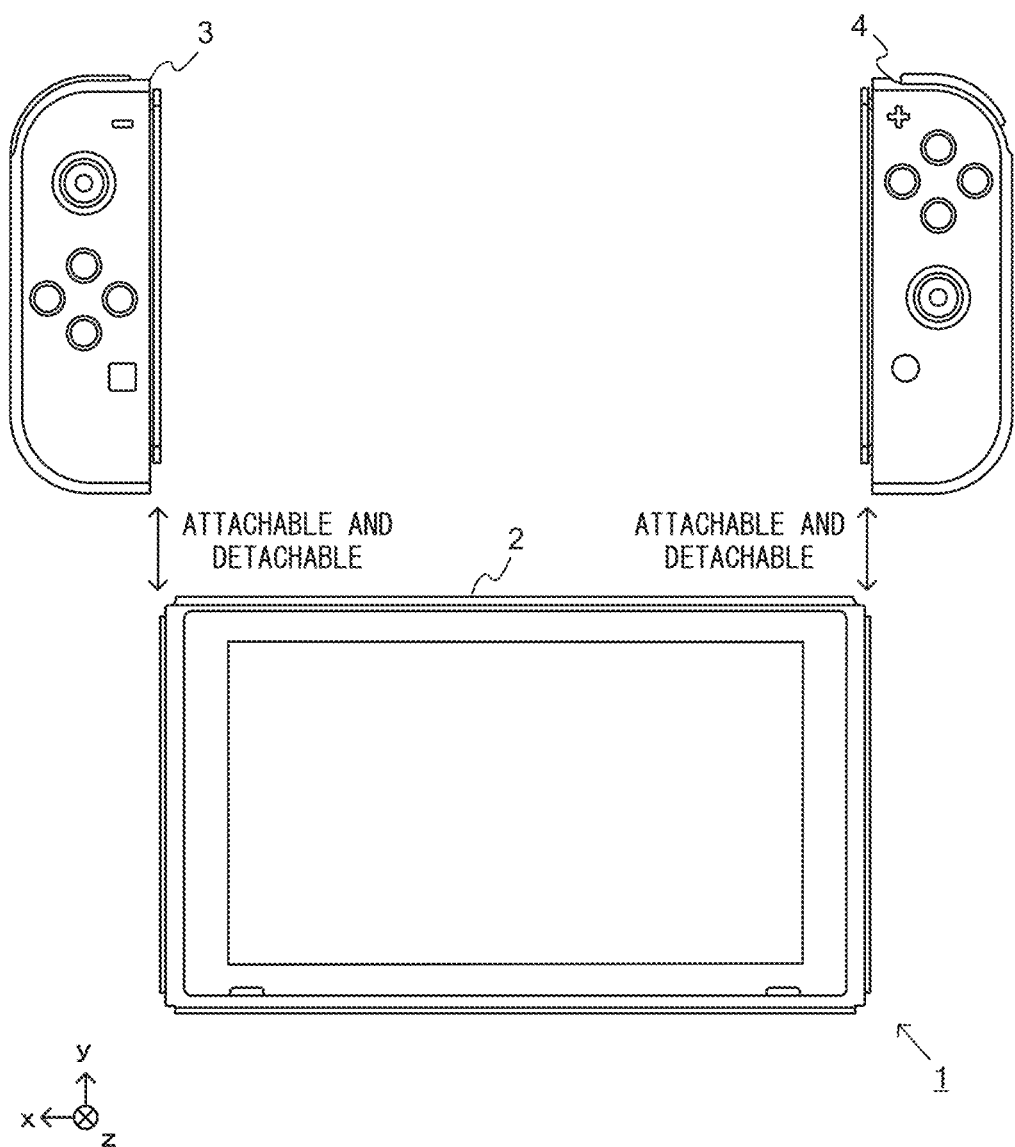
FIG. 2 is a diagram illustrating a non-limiting example of a state where a left controller 3 and a right controller 4 are detached from a main body apparatus 2.

FIG. 2 is a diagram illustrating a non-limiting example of the state where each of the left controller 3 and the right controller 4 is detached from the main body apparatus 2. As illustrated in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller."

Figure 3:
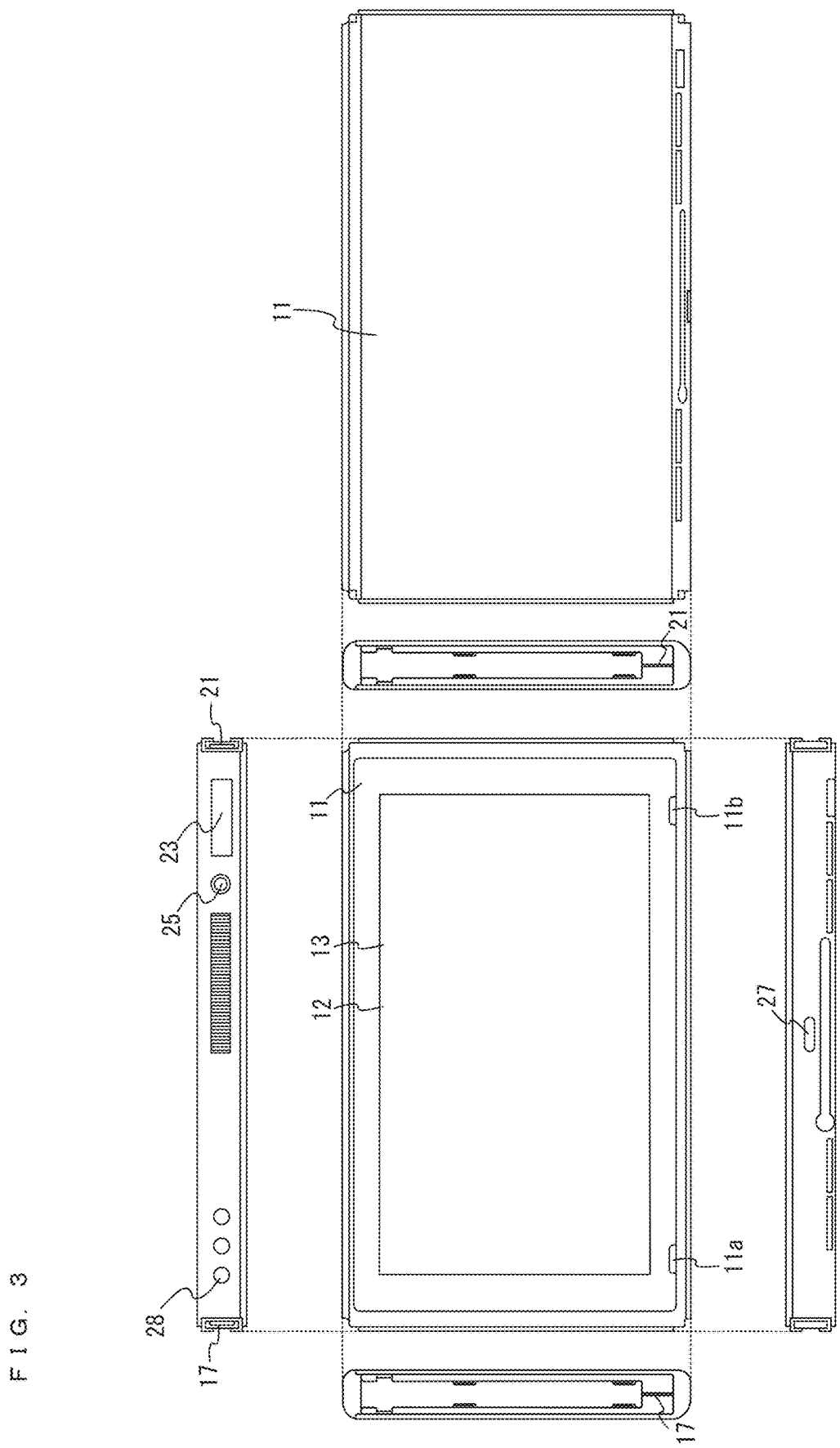
FIG. 3 illustrates six orthogonal views of a non-limiting example of a main body apparatus 2.

FIG. 3 illustrates six orthogonal views of a non-limiting example of the main body apparatus 2. As illustrated in FIG. 3, the main body apparatus 2 includes an approximately plate-shaped housing 11. In the present non-limiting example, a main surface (in other words, a surface on a front side, i.e., a surface on which the display 12 is provided) of the housing 11 has a generally rectangular shape.

It should be noted that the shape and the size of the housing 11 are optional. As a non-limiting example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As illustrated in FIG. 3, the main body apparatus 2 includes the display 12, which is provided on the main surface of the housing 11. The display 12 displays an image generated by the main body apparatus 2. In the present non-limiting example, the display 12 is a liquid crystal display device (LCD). The display 12, however, may be a display device of any suitable type.

In addition, the main body apparatus 2 includes a touch panel 13 on the screen of the display 12. In the present non-limiting example, the touch panel 13 allows multi-touch input (e.g., a capacitive touch panel). It should be noted that the touch panel 13 may be of any suitable type, e.g., it allows single-touch input (e.g., a resistive touch panel).

The main body apparatus 2 includes a speaker (i.e., a speaker 88 illustrated in FIG. 6) inside the housing 11. As illustrated in FIG. 3, speaker holes 11a and 11b are formed in the main surface of the housing 11. The speaker 88 outputs sounds through the speaker holes 11a and 11b.

The main body apparatus 2 also includes a left-side terminal 17 that enables wired communication between the main body apparatus 2 and the left controller 3, and a right-side terminal 21 that enables wired communication between the main body apparatus 2 and the right controller 4.

As illustrated in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower-side terminal 27. The lower-side terminal 27 allows the main body apparatus 2 to communicate with a cradle. In the present non-limiting example, the lower-side terminal 27 is a USB connector (more specifically, a female connector). When the unified apparatus or the main body apparatus 2 alone is placed on the cradle, the game system 1 can display, on a stationary monitor, an image that is generated and output by the main body apparatus 2. Also, in the present non-limiting example, the cradle has the function of charging the unified apparatus or the main body apparatus 2 alone, being placed thereon. The cradle also functions as a hub device (specifically, a USB hub).

Figure 4:
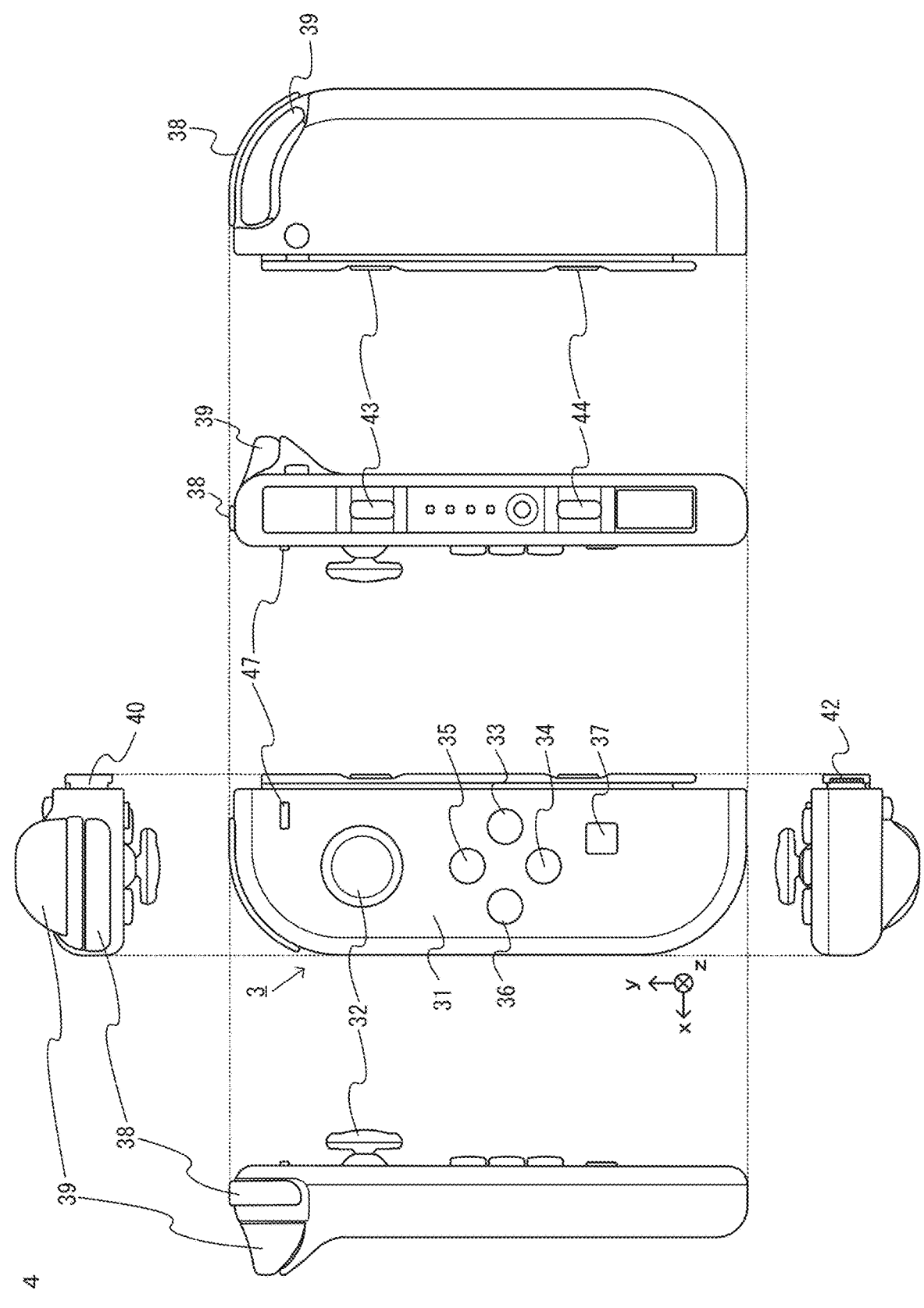
FIG. 4 illustrates six orthogonal views of a non-limiting example of a left controller 3.

FIG. 4 illustrates six orthogonal views of a non-limiting example of the left controller 3. As illustrated in FIG. 4, the left controller 3 includes a housing 31. In the present non-limiting example, the housing 31 has a vertically long shape, e.g., is shaped to be long in an up-down direction (i.e., a y-axis direction illustrated in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As illustrated in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the present non-limiting example, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 also includes a terminal 42 that enables wired communication between the left controller 3 and the main body apparatus 2.

Figure 5:
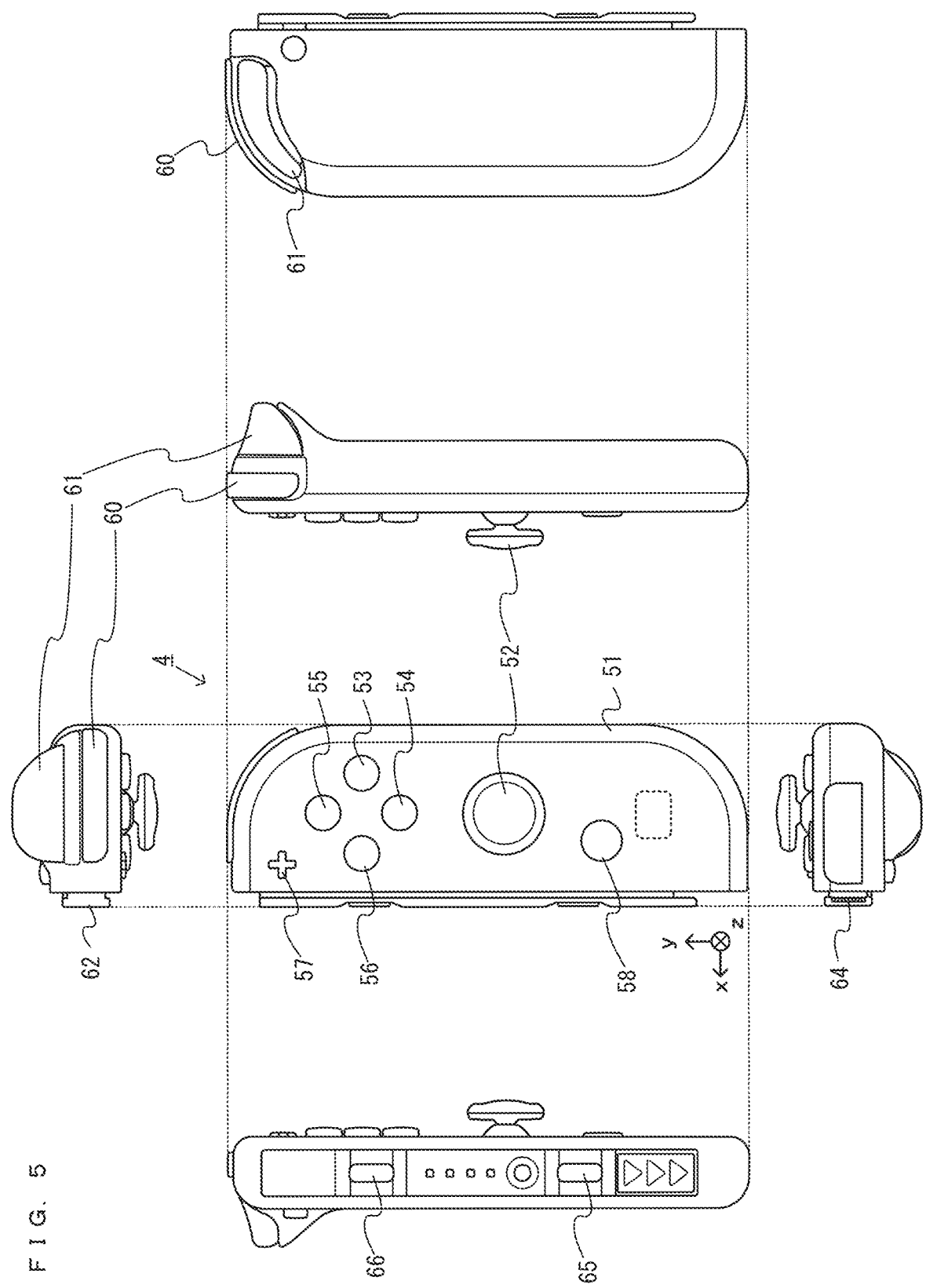
FIG. 5 illustrates six orthogonal views of a non-limiting example of a right controller 4.

FIG. 5 illustrates six orthogonal views of a non-limiting example of the right controller 4. As illustrated in FIG. 5, the right controller 4 includes a housing 51. In the present non-limiting example, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the present non-limiting example, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for allowing the right controller 4 to perform wired communication with the main body apparatus 2.

Figure 6:
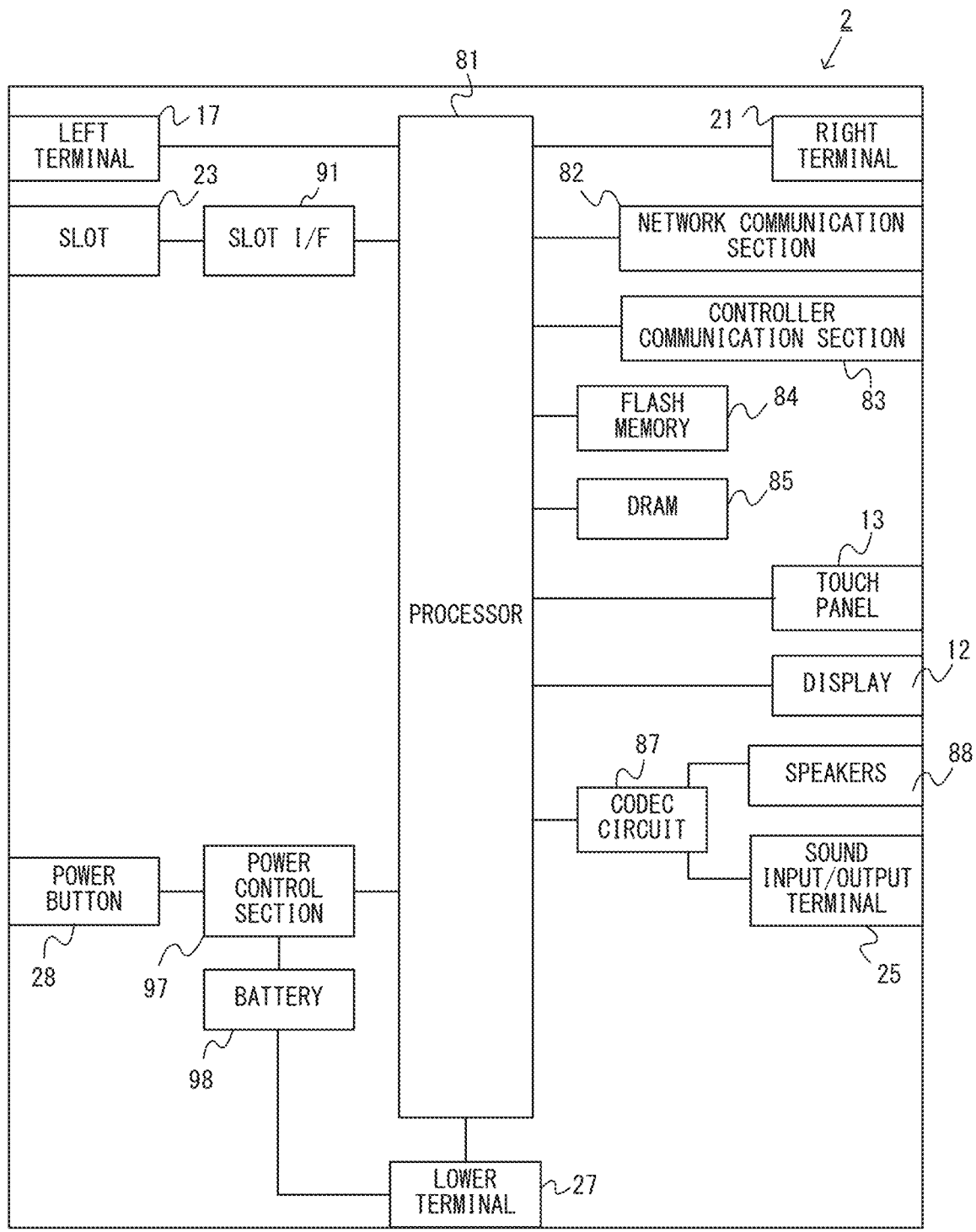
FIG. 6 is a block diagram illustrating a non-limiting example of an internal configuration of a main body apparatus 2.

FIG. 6 is a block diagram illustrating a non-limiting example of an internal configuration of the main body apparatus 2. The main body apparatus 2 includes components 81 to 91, 97, and 98 illustrated in FIG. 6 in addition to the components illustrated in FIG. 3. Some of the components 81 to 91, 97, and 98 may be implemented as electronic parts on an electronic circuit board, which is contained in the housing 11.

The main body apparatus 2 includes a processor 81. The processor 81 is an information processor for executing various types of information processing to be executed by the main body apparatus 2. For example, the CPU 81 may include only a central processing unit (CPU), or may be a system-on-a-chip (SoC) having a plurality of functions such as a CPU function and a graphics processing unit (GPU) function. The processor 81 executes an information processing program (e.g., a game program) stored in a storage section (specifically, an internal storage medium such as a flash memory 84, an external storage medium that is attached to the slot 23, or the like), thereby executing the various types of information processing.

The main body apparatus 2 includes a flash memory 84 and a dynamic random access memory (DRAM) 85 as examples of internal storage media built in itself. The flash memory 84 and the DRAM 85 are connected to the CPU 81. The flash memory 84 is mainly used to store various data (or programs) to be saved in the main body apparatus 2. The DRAM 85 is used to temporarily store various data used in information processing.

The main body apparatus 2 includes a slot interface (hereinafter abbreviated to "I/F") 91. The slot I/F 91 is connected to the processor 81. The slot I/F 91 is connected to the slot 23, and reads and writes data from and to a predetermined type of storage medium (e.g., a dedicated memory card) attached to the slot 23, in accordance with commands from the processor 81.

The processor 81 reads and writes, as appropriate, data from and to the flash memory 84, the DRAM 85, and each of the above storage media, thereby executing the above information processing.

The main body apparatus 2 includes a network communication section 82. The network communication section 82 is connected to the processor 81. The network communication section 82 communicates (specifically, through wireless communication) with an external apparatus via a network. In the present non-limiting example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a particular protocol or infrared light communication). It should be noted that the wireless communication in the above second communication form achieves the function of allowing so-called "local communication," in which the main body apparatus 2 can wirelessly communicate with another main body apparatus 2 located in a closed local network area, and the plurality of main body apparatuses 2 directly communicate with each other to exchange data.

The main body apparatus 2 includes a controller communication section 83. The controller communication section 83 is connected to the processor 81. The controller communication section 83 wirelessly communicates with the left controller 3 and/or the right controller 4. The main body apparatus 2 may communicate with the left and right controllers 3 and 4 using any suitable communication method. In the present non-limiting example, the controller communication section 83 performs communication with the left and right controllers 3 and 4 in accordance with the Bluetooth (registered trademark) standard.

The processor 81 is connected to the left-side terminal 17, the right-side terminal 21, and the lower-side terminal 27. When performing wired communication with the left controller 3, the processor 81 transmits data to the left controller 3 via the left-side terminal 17 and also receives operation data from the left controller 3 via the left-side terminal 17. Further, when performing wired communication with the right controller 4, the processor 81 transmits data to the right controller 4 via the right-side terminal 21 and also receives operation data from the right controller 4 via the right-side terminal 21. Further, when communicating with the cradle, the processor 81 transmits data to the cradle via the lower-side terminal 27. As described above, in the present non-limiting example, the main body apparatus 2 can perform both wired communication and wireless communication with each of the left and right controllers 3 and 4. Further, when the unified apparatus obtained by attaching the left and right controllers 3 and 4 to the main body apparatus 2 or the main body apparatus 2 alone is attached to the cradle, the main body apparatus 2 can output data (e.g., image data or sound data) to a stationary monitor or the like via the cradle.

Here, the main body apparatus 2 can communicate with a plurality of left controllers 3 simultaneously (or in parallel). Further, the main body apparatus 2 can communicate with a plurality of right controllers 4 simultaneously (or in parallel). Thus, a plurality of users can simultaneously provide inputs to the main body apparatus 2, each using a set of left and right controllers 3 and 4. As a non-limiting example, a first user can provide an input to the main body apparatus 2 using a first set of left and right controllers 3 and 4, and at the same time, a second user can provide an input to the main body apparatus 2 using a second set of left and right controllers 3 and 4.

Further, the display 12 is connected to the processor 81. The processor 81 displays, on the display 12, a generated image (e.g., an image generated by executing the above information processing) and/or an externally obtained image.

The main body apparatus 2 includes a codec circuit 87 and speakers (specifically, a left speaker and a right speaker) 88. The codec circuit 87 is connected to the speakers 88 and an audio input/output terminal 25 and also connected to the processor 81. The codec circuit 87 is for controlling the input and output of audio data to and from the speakers 88 and the sound input/output terminal 25.

The main body apparatus 2 includes a power control section 97 and a battery 98. The power control section 97 is connected to the battery 98 and the processor 81. Further, although not illustrated, the power control section 97 is connected to components of the main body apparatus 2 (specifically, components that receive power supplied from the battery 98, the left-side terminal 17, and the right-side terminal 21). Based on a command from the processor 81, the power control section 97 controls the supply of power from the battery 98 to each of the above components.

Further, the battery 98 is connected to the lower-side terminal 27. When an external charging device (e.g., the cradle) is connected to the lower-side terminal 27, and power is supplied to the main body apparatus 2 via the lower-side terminal 27, the battery 98 is charged with the supplied power.

Figure 7:
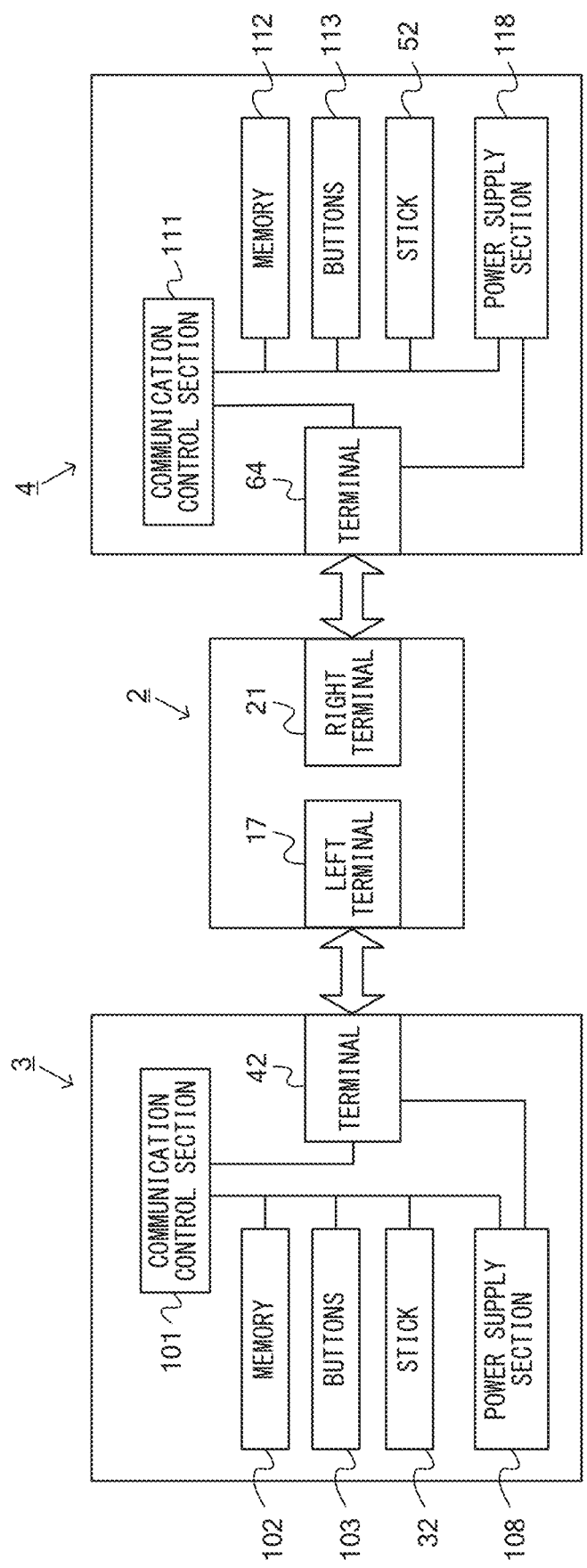
FIG. 7 is a block diagram illustrating examples of internal configurations of a main body apparatus 2, a left controller 3, and a right controller 4.

FIG. 7 is a block diagram illustrating non-limiting examples of the internal configurations of the main body apparatus 2, the left controller 3, and the right controller 4. It should be noted that the details of the internal configuration of the main body apparatus 2 are illustrated in FIG. 6 and therefore are omitted in FIG. 7.

The left controller 3 includes a communication control section 101, which communicates with the main body apparatus 2. As illustrated in FIG. 7, the communication control section 101 is connected to components including the terminal 42. In the present non-limiting example, the communication control section 101 can communicate with the main body apparatus 2 through both wired communication via the terminal 42 and wireless communication without via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the present non-limiting example, the power supply section 108 includes a battery and a power control circuit. Although not illustrated in FIG. 7, the power control circuit is connected to the battery and also connected to components of the left controller 3 (specifically, components that receive power supplied from the battery).

As illustrated in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, a communication control section 111 can communicate with the main body apparatus 2 through both wired communication via the terminal 64 and wireless communication without via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

As described above, in the game system 1 of the present non-limiting example, the left controller 3 and the right controller 4 are removable from the main body apparatus 2. In addition, when the unified apparatus obtained by attaching the left controller 3 and the right controller 4 to the main body apparatus 2 or the main body apparatus 2 alone is attached to the cradle, an image (and sound) can be output on an external display device, such as a stationary monitor or the like. The game system 1 will be described below according to a non-limiting embodiment in which an image is displayed on the display 12.

A game is played using a virtual space displayed on the display 12, according to operations performed on the operation buttons and sticks of the left controller 3 and/or the right controller 4, or touch operations performed on the touch panel 13 of the main body apparatus 2, in the game system 1. In the present non-limiting example, as a non-limiting example, a game can be played in which a plurality of characters and the like disposed in the virtual space are caused to perform an action according to the user's operation using the operation buttons, the sticks, and the touch panel 13.

Figure 8:
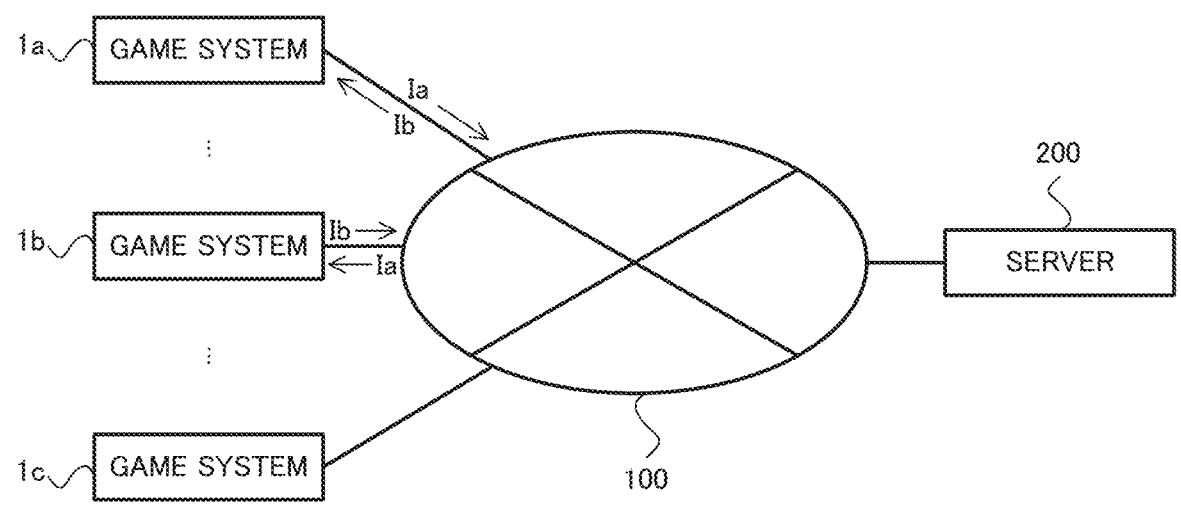
FIG. 8 is a block diagram illustrating a non-limiting example of a configuration of an information processing system.
Figure 9:
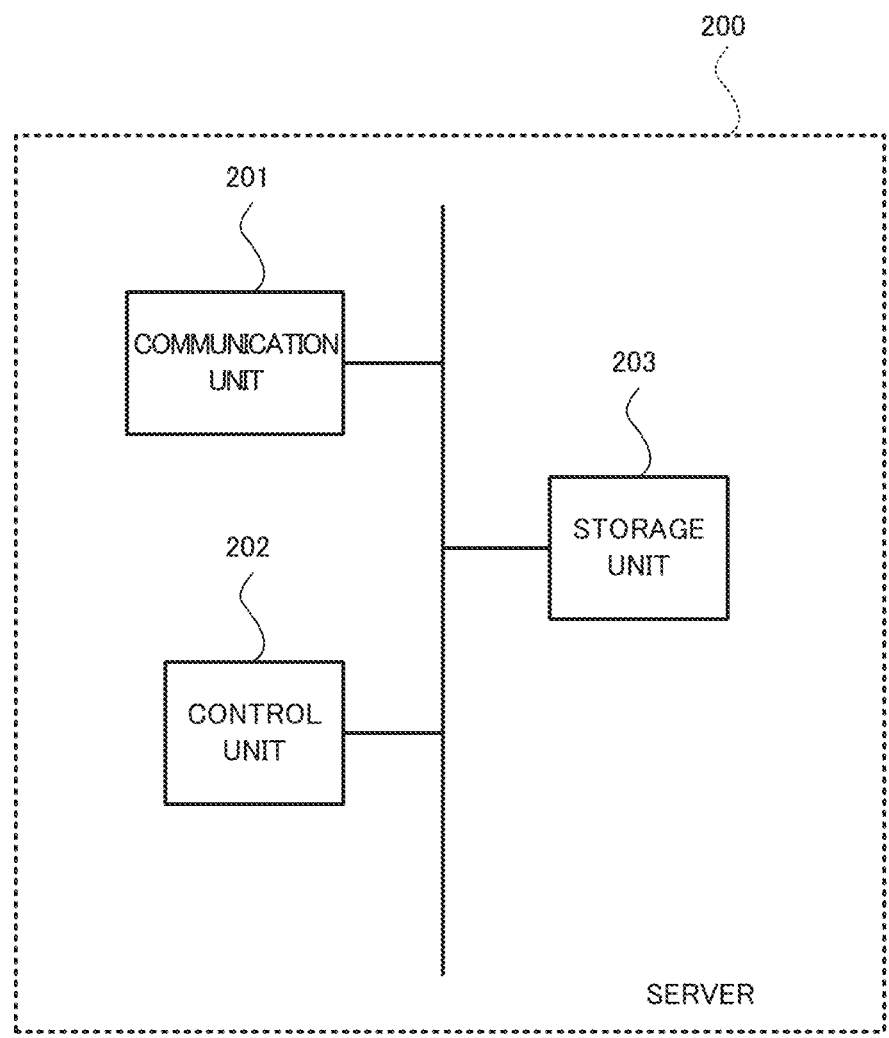
FIG. 9 is a block diagram illustrating a non-limiting example of a configuration of a server 200.

An information processing system including a plurality of game systems 1 and a server 200 will be described with reference to FIGS. 8 and 9. FIG. 8 is a block diagram illustrating a non-limiting example of a configuration of the information processing system. FIG. 9 is a block diagram illustrating a non-limiting example of a configuration of the server 200.

As illustrated in FIG. 8, the plurality of game systems 1 and the server 200 are connected together through a network 100 to form an information processing system. The game systems 1 are connectable to the network 100 through wireless or wired communication, and, together with the server 200, form a client-server system. For example, each game system 1 is capable of executing a predetermined application (e.g., a game application). The game system 1 also executes the predetermined application to establish a connection with the server 200 through the network 100, which allows the game system 1 to communicate with the server 200.

The server 200 has a communication unit 201, a control unit 202, and a storage unit 203. The communication unit 201 communicates with the game systems 1 and the like through the network 100 by exchanging communication packets. As a non-limiting example, the control unit 202 performs a process of managing the progression of a game performed along with the game systems 1, a process of managing characters exchanged between users, exchange locations, and the like, a process of managing information about payment or charging, and the like. The control unit 202 also establishes a communication link to the game systems 1 and the like through the communication unit 201, and performs data transmission control and routing on the network 100. When a game (e.g., exchange of characters) is performed along with a plurality of game systems 1, the control unit 202 manages a pairing or grouping of game systems 1 that perform the game, and data communication between those game systems 1. The storage unit 203 stores programs that are executed by the control unit 202, various kinds of data used for the above processes, various kinds of data used for communication with the game systems 1, and the like. It should be noted that when the system employs a predetermined log-in process for data exchange performed through the network 100, the server 200 may perform an authentication process to determine whether or not a user who is trying to log in is an authorized user. The server 200 may be a single server machine or may include a plurality of server machines.

In the present non-limiting example, a process of exchanging items or characters used in a game as a thing to be exchanged between users can be performed. When the exchange is performed, thing-to-be-exchanged information data I indicating information about the thing to be exchanged is transmitted and received through the server 200. For example, if the exchange has been successfully settled between a user of a game system 1*a* and a user of a game system 1*b*, thing-to-be-exchanged information data Ia that is information about a thing to be exchanged which the user of the game system 1*a* has put up for exchange is transmitted from the game system 1*a* to the game system 1*b* through the server 200. In addition, thing-to-be-exchanged information data Ib that is information about a thing to be exchanged which the user of the game system 1*b* has put up for exchange is transmitted from the game system 1*b* to the game system 1*a* through the server 200. By transmitting and receiving these pieces of thing-to-be-exchanged information data I, a process of exchanging things to be exchanged between the user of the game system 1*a* and the user of the game system 1*b* is performed. The exchange of the present non-limiting example includes a method in which the user of the game system 1*b* receives a thing to be exchanged from the game system 1*a*, and gives the thing to be exchanged to the user of the game system 1*c*, which is not a one-on-one exchange. It should be noted that in the present non-limiting example, information about a thing to be exchanged includes at least information about an item or character designated as a thing to be exchanged by a user and information about a place designated by the user (place where the user puts a thing to be exchanged up for exchange). In the description that follows, characters are used as a non-limiting example of a thing to be exchanged.

First Embodiment

Figure 10:
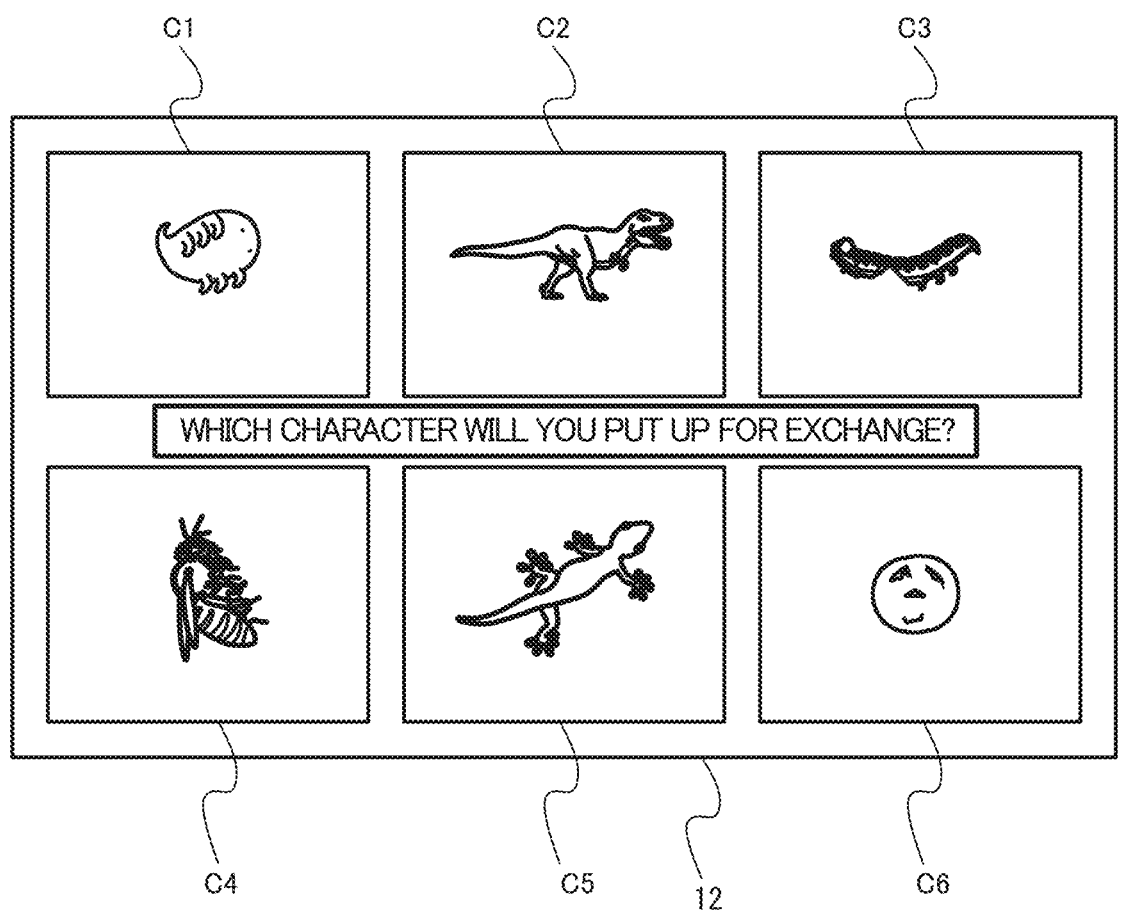
FIG. 10 is a diagram illustrating a non-limiting example of a game image that is displayed in a character choice situation in a game process according to a first embodiment.
Figure 11:
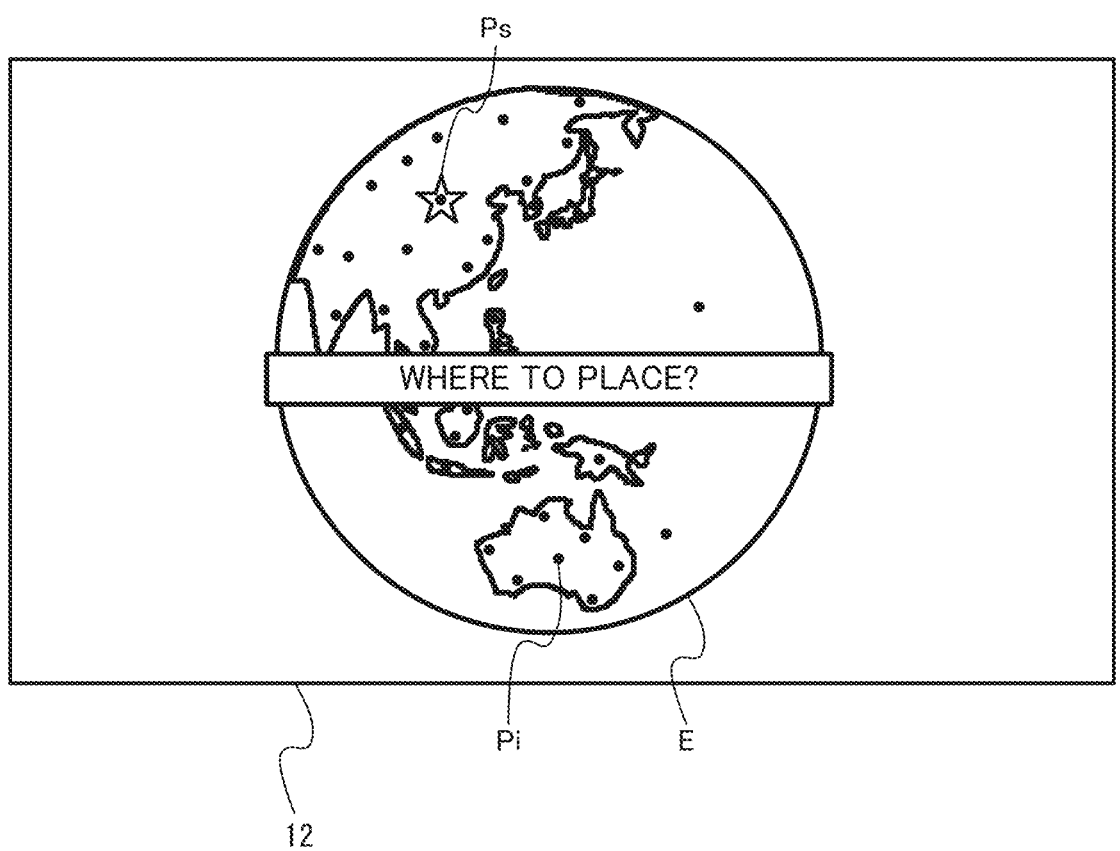
FIG. 11 is a diagram illustrating a non-limiting example of a game image that is displayed in a place choice situation in a game process according to a first embodiment.
Figure 12:
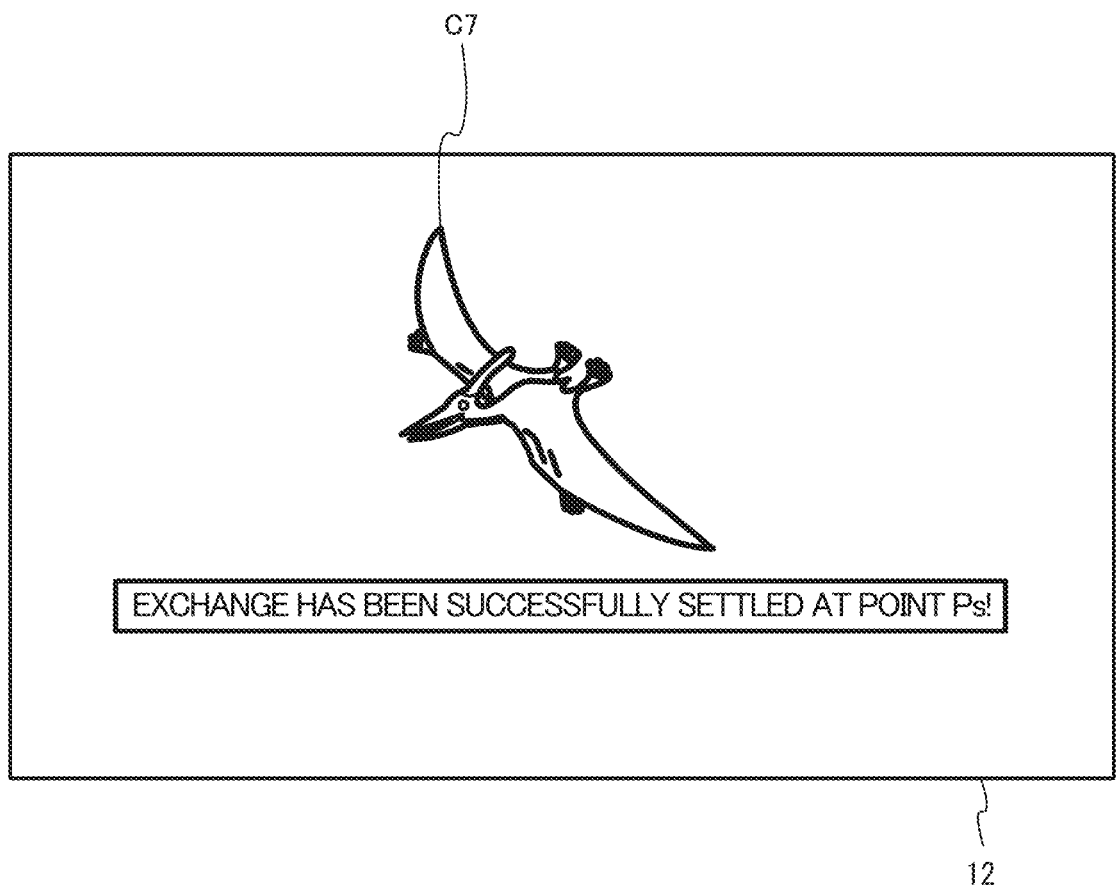
FIG. 12 is a diagram illustrating a game image that is displayed in a successful exchange settlement scene in a game process according to a first embodiment.
Figure 13:
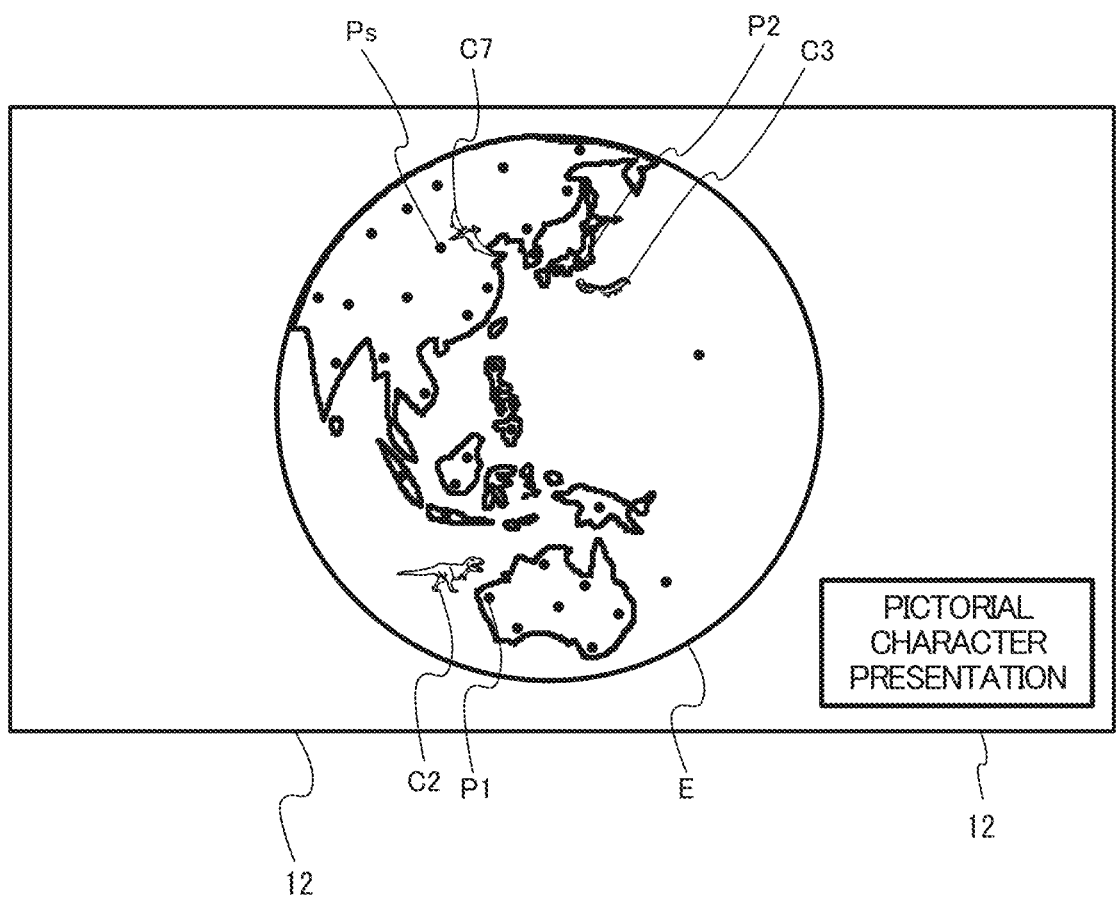
FIG. 13 is a diagram illustrating a first display example of a game image that is displayed in a pictorial representation display situation in a game process according to a first embodiment.
Figure 14:
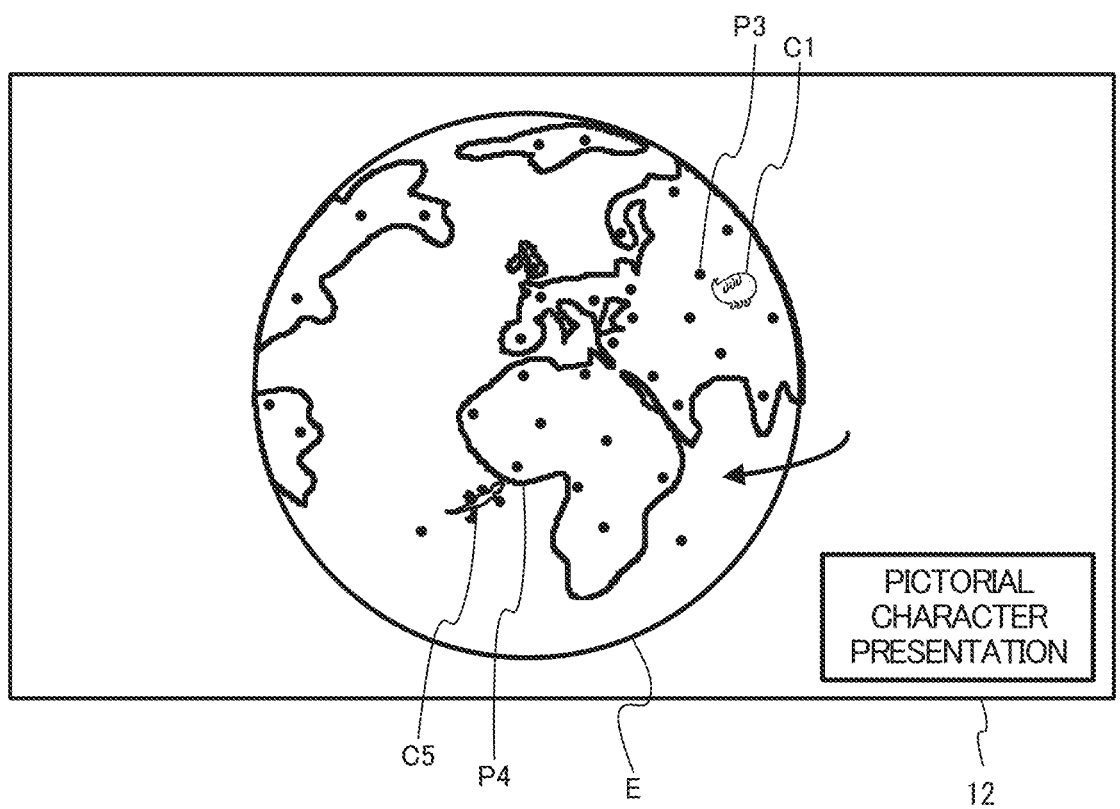
FIG. 14 is a diagram illustrating a non-limiting example of a game image that is displayed with a globe object E rotated in a pictorial representation display situation in a game process according to a first embodiment.
Figure 15:
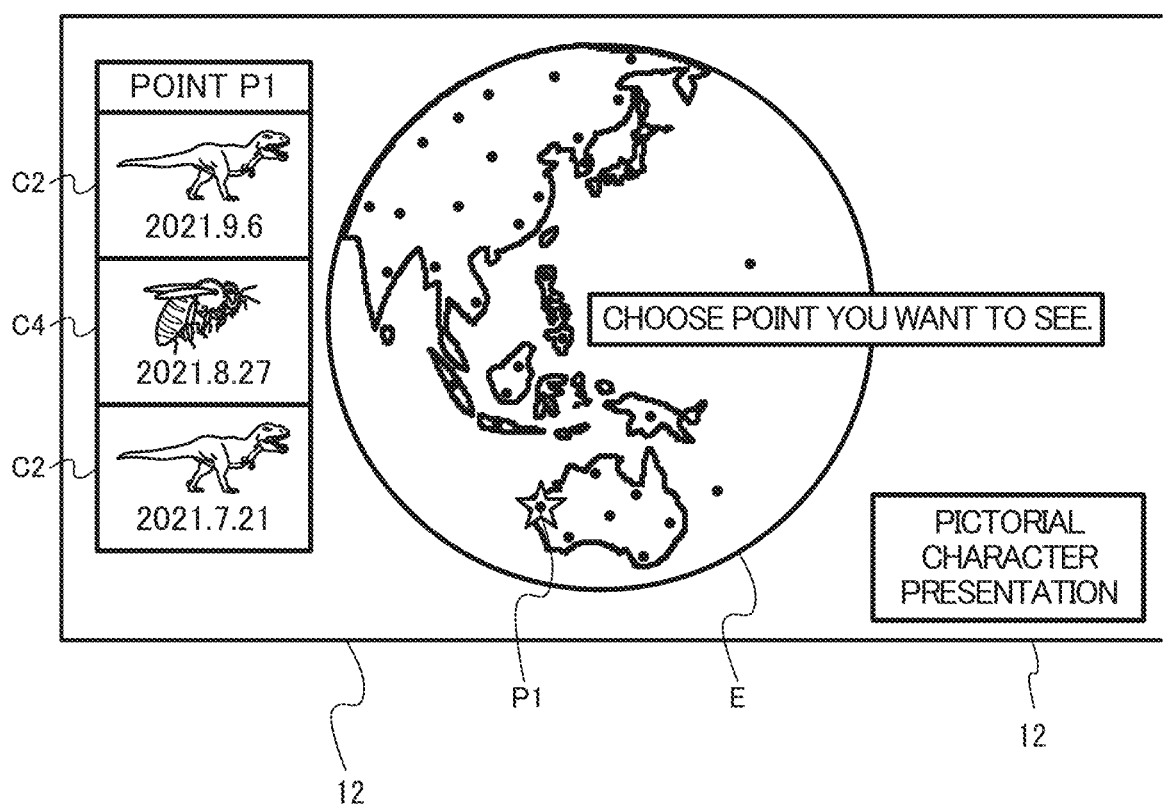
FIG. 15 is a diagram illustrating a second display example of a game image that is displayed in a pictorial representation display situation in a game process according to a first embodiment.

A non-limiting example of a game process (character exchange and display processes) according to a first embodiment will be described with reference to FIGS. 10-15. It should be noted that FIG. 10 is a diagram illustrating a non-limiting example of a game image that is displayed in a character choice situation in the game process of the first embodiment. FIG. 11 is a diagram illustrating a non-limiting example of a game image that is displayed in a place choice situation in the game process of the first embodiment. FIG. 12 is a diagram illustrating a game image that is displayed in a successful exchange settlement scene in the game process of the first embodiment. FIG. 13 is a diagram illustrating a non-limiting first display example of a game image that is displayed in a pictorial representation display situation in the game process of the first embodiment. FIG. 14 is a diagram illustrating a non-limiting example of a game image that is displayed with a globe object E rotated in a pictorial representation display situation in the game process of the first embodiment. FIG. 15 is a diagram illustrating a non-limiting second display example of a game image that is displayed in a pictorial representation display situation in the game process of the first embodiment.

In FIG. 10, when the user of a game system 1 exchanges a character with another user, the user of the game system 1 themselves chooses a character that the user is to put up for exchange to the second user in a first stage of the exchange. Here, characters are a game object that is used in a game, and when chosen by a user, are allowed to appear and perform an action in a virtual space. For example, in a game image illustrated in FIG. 10, a list of characters that the user can put up for exchange is displayed on the display 12 as options for a thing to be exchanged that is to be put up for exchange. A character that is presented as an option for exchange is one of characters currently possessed by a user that can be given to an exchanging partner, and may be a character that has been previously obtained from an exchanging partner. In the non-limiting example of FIG. 10, six characters C1-C6 are displayed as options for a thing to be exchanged that is to be put up for exchange. From the six characters C1-C6, one is designated as a thing to be exchanged that is to be put up for exchange to another user according to the user's operation using the game system 1.

Next, in a second stage of the exchange, a place where the user is to put a character that has been chosen as a thing to be exchanged, up for exchange, is designated. In the present non-limiting example, as illustrated in FIG. 11, a user interface is used that represents a place where a user puts a thing to be exchanged up for exchange, by a globe object E. The globe object E is a three-dimensional spherical object representing the earth of the real world. In the non-limiting example of FIG. 11, an image of the globe object E as viewed from a predetermined direction is displayed. It should be noted that the globe object E may have, on the surface thereof, undulations corresponding to the terrains of the earth. Alternatively, the entire globe object E has a smooth spherical surface. It should be noted that the globe object E corresponds to a non-limiting example of a predetermined user interface.

A user can designate a place where the user is to put a character as a thing to be exchanged, up for exchange, by choosing any from a plurality of points Pi set on the globe object E (places indicated by black points in FIG. 11, e.g., 630 points). For example, in the non-limiting example of FIG. 11, a point Ps (star-shaped point illustrated in FIG. 11) of the plurality of points Pi has been designated as a place for exchange. A point may be designated by any suitable method. As a first non-limiting example, one of the plurality of points Pi may be designated that is located closest to a location of the globe object E that coincides with a location in a displayed image pointed by the user's operation. As a second non-limiting example, a user may perform an operation of specifying coordinates or a latitude and a longitude on the globe object E, to designate a point closest to the specified location. As a third non-limiting example, a point may be designated by a user's operation of choosing one from the plurality of points Pi presented as options. As a fourth non-limiting example, a point may be designated based on a location on the globe object E corresponding to a chosen country name, region name, city name, town name, or the like. As a fifth non-limiting example, a point may be designated based on a location on the globe object E corresponding to a place previously set by a user (e.g., an address, living place, or current location previously set by a user). As a sixth non-limiting example, in initial setting of a game, a point for exchange by a user may be previously set. As a seventh non-limiting example, a point for exchange may be set at random.

Next, in a third stage of the exchange, the game system 1 operated by the user makes an application for exchange of characters to the server 200. Thereafter, the server 200 performs a process of choosing an exchanging partner that is to exchange for a character for which the user has applied for exchange. For example, in the application for exchange, the game system 1 transmits, to the server 200, the thing-to-be-exchanged information data I (see FIG. 8) including at least information indicating a character put up for exchange and information indicating a designated point (place for exchange). It should be noted that in the present non-limiting example, an application for exchange is made without designating an exchanging partner, a character that a user desires to obtain by exchange, or the like.

In a fourth stage of the exchange, the server 200 determines whether or not to successfully settle the exchange, and chooses an exchanging partner. In the first embodiment, if an application for exchange has been made by another user at the same point where the first user has made an application for exchange (a place for exchange designated by the first user), the server 200 chooses the second user as an exchanging partner. For example, in the non-limiting example of FIG. 11, if another user has made an application for exchange with the point Ps designated as a place for exchange, the first user exchanges characters with the second user. It should be noted that an application for exchange of characters is valid during a valid exchange period that is a predetermined period of time from the time that the exchange application is made. If an exchanging partner is found during the valid exchange period, exchange with the exchanging partner is successfully settled. It should be noted that during the valid exchange period, in the game system 1, an image showing that the game system 1 is communicating with the server 200 and an exchanging partner is being searched for (e.g., an image of the globe object E that is taken when no character is disposed) may be displayed, and another game process may be executed in parallel to the application for exchange.

When a first user of a game system 1 makes an application for exchange and then the server 200 receives thing-to-be-exchanged information data I1, the server 200 sets a character uploaded by the first user at a designated point based on the thing-to-be-exchanged information data I1, and stores the character into the storage unit 203. If at least one character possessed by another user(s) has been set at the same point, the server 200 chooses a character of the second user to be exchanged for the uploaded character of the first user, and successfully settles the exchange. If the exchange has been successfully settled, the server 200 transmits, to the game system 1 of the first user, thing-to-be-exchanged information data I2 including at least information indicating a character for which the second user made an application for exchange and information indicating a point designated by the second user in the application for exchange, and thereby notifies the first user of successful settlement of the exchange. The server 200 also transmits, to the game system 1 of the second user, the thing-to-be-exchanged information data I1 including at least information indicating a character for which the first user made an application for exchange and information indicating a point designated by the first user in the application for exchange, and thereby notifies the second user of successful settlement of the exchange. Thereafter, the server 200 deletes, from the storage unit 203, information related to the first user's character and the second user's character involved in the application for exchange.

If no character of another user has been set at the same point and the valid exchange period has expired, the server 200 determines that exchange for the uploaded character of the first user has not been successfully settled. If the exchange has not been successfully settled, the server 200 transmits unsuccessful exchange settlement data indicating that the exchange has not been successfully settled to the game system 1 of the first user. Thereafter, the server 200 deletes information related to the first user's character involved in the application for exchange.

In a fifth stage of the exchange, in the game system 1, the user is notified of whether or not the exchange has been successfully settled. When the game system 1 receives, from the server 200, the thing-to-be-exchanged information data I indicating that the exchange has been successfully settled, the game system 1 displays an image that notifies the user of successful settlement of the exchange on the display 12. For example, as illustrated in FIG. 12, if the exchange of characters has been successfully settled, an image showing a character obtained from another user by the exchange (in the non-limiting example of FIG. 12, a character C7) and an image that notifies the user of a point where the exchange has been successfully settled (in the non-limiting example of FIG. 12, the point Ps, which is the same point designated by the user in the exchange) are displayed on the display 12. Thereafter, the game system 1 puts the character given to the second user in the exchange into a state that the user no longer possesses the character (e.g., if the character was obtained by exchange in the past, the character can continue to be pictorially displayed as an exchange record using a globe object E described below, and the character can no longer be used in a game, e.g., the character cannot appear in the virtual space or perform an action). The game system 1 also adds the character newly obtained by exchange with the second user as a character that can be used in a game, and manages information indicating the point designated by the second user in the exchange of characters in association with that character.

Otherwise, when the game system 1 receives, from the server 200, unsuccessful exchange settlement data indicating that the exchange has not been successfully settled, the game system 1 displays, on the display 12, an image that notifies the user of the unsuccessful settlement of the exchange. When the exchange has not been successfully settled, the game system 1 may cause the character, for which exchange for the second user's character has not been successfully settled, to come back as a character that can be used in a game, or puts that character into a state that the character is no longer possessed by the user.

In the present non-limiting example, a character that has been obtained from an exchanging partner by the above exchange can be displayed. In a first display example, as illustrated in FIG. 13, each character that has been obtained by exchange is displayed on the globe object E at a corresponding place designated by the exchanging partner of the character. For example, in a non-limiting example of a game image of FIG. 13, a character C7 for which exchange has been successfully settled at the point Ps as described above is displayed on the globe object E in the vicinity of the point Ps. A character C2 for which another exchange has been successfully settled at a point P1 is displayed on the globe object E in the vicinity of the point P1. A character C3 for which another exchange has been successfully settled at a point P2 is displayed on the globe object E in the vicinity of the point P2. Thus, a character obtained by exchange is displayed on the globe object E in the vicinity of a point where the exchange has been successfully settled, which can provide a pictorial character representation that shows characters that have been obtained by exchange and places where the characters have been obtained.

The globe object E can also be rotated and displayed according to a rotation instruction based on the user's operation input. For example, when a rotation instruction to rotate the globe object E of FIG. 13 is performed, the globe object E is displayed as illustrated FIG. 14. Due to this rotation instruction, the characters C2, C3, and C7, which were located on the front side in the state of FIG. 13, are moved to the back side and are no longer displayed, and the characters C1 and C5, which were located at points P3 and P4, respectively, in the state of FIG. 14, are moved to the front side and can be displayed. It should be noted that the globe object E may rotate about its own axis or may revolve in any revolution direction according to a rotation instruction based on the user's operation input.

Thus, in the case where the globe object E is configured to be rotatable, the user can view objects disposed on the entire surface of the globe object E, and can confirm a place where each object has been exchanged, on the entire surface of the globe object E.

As a second display example in which a character that has been obtained from an exchanging partner by the exchange is displayed, when a point is chosen on the globe object E, a list of characters that have been obtained by exchange with the point designated. For example, as illustrated in FIG. 15, a list of characters already obtained from an exchanging partner by exchange is displayed by an operation of choosing a place designated by the exchanging partner on the globe object E. Specifically, a display form of the point P1 is changed according to choice of the point P1 on the globe object E by the user's operation, and a list of the characters C2 and C4, which have been obtained by exchange with the point P1 designated by an exchanging partner, is displayed together with the dates of successful settlement of exchanges. It should be noted that in the case where the same character has been obtained at a point by different exchanges as illustrated in FIG. 15, as many copies of the character may be redundantly displayed together with the respective dates of successful settlement of the exchanges, for example.

It should be noted that even in the second display example in which a character that has been obtained from an exchanging partner by the exchange is displayed, the globe object E may be rotated and displayed according to a rotation instruction based on the user's operation input as in the first display example. Alternatively, a character that has been obtained from an exchanging partner by the exchange may be displayed using both of the first and second display examples. As a non-limiting example, at a point where a single character has been obtained by exchange, the character is displayed in the display form of the first display example, and at a point where a plurality of characters have been obtained by exchange, the characters are displayed in the display form of the second display example. As another non-limiting example, even when a character that has been obtained from an exchanging partner is displayed using the second display example, a single representative character (e.g., one of a plurality of characters that has been most recently obtained) is displayed, for each point, on the globe object E in the vicinity of the point using the first display example.

Although in the above non-limiting examples, the user interface for designating a place where a user is to put up for exchange, and the user interface for viewing a thing to be exchanged (character) that has been obtained from an exchanging partner by exchange, have been described using the same globe object E, these user interfaces may be the same or different.

Although in the above non-limiting examples, the globe object E is used as the user interface for designating a place where a user is to put up for exchange and the user interface for viewing a thing to be exchanged (character) that has been obtained from an exchanging partner by exchange, other images may be used as at least one of the user interfaces. For example, a user interface that employs an image indicating a two-dimensional or three-dimensional map may be used to allow a user to choose an area or point on the map to designate a place where the user is to put up for exchange, or may dispose and display, on the map, a thing to be exchanged that has been obtained from an exchanging partner by exchange. The above user interface may be an object indicating a globe representing an actual world, or an image showing a map, or the like, or alternatively, an object indicating a celestial body in a virtual world, or an image showing a two-dimensional or three-dimensional map, or the like.

In the present non-limiting example, a predetermined reward that can be used in a game in which the character appears may be given to a user based on the number of points that have been designated by exchanging partners and for which the exchange has been finished. For example, if a history of points that have been designated by exchanging partners and for which the exchange has been finished indicates that the number of the points (the number of places) has reached a predetermined value, an item, character, in-game currency, ability, experience point, release of a hidden element or stage, or the like that is advantageous to progression of the game is given as a reward to a user. Thus, a reward is given to a user due to accumulation of the number of places designated by exchanging partners in exchange, which can add a greater incentive to information about places that is obtained as additional information for information about characters obtained by exchange. In addition, because points where a character obtained by exchange was designated can be confirmed using the globe object E, a condition for giving the reward can be assessed by a user.

Second Embodiment

Figure 16:
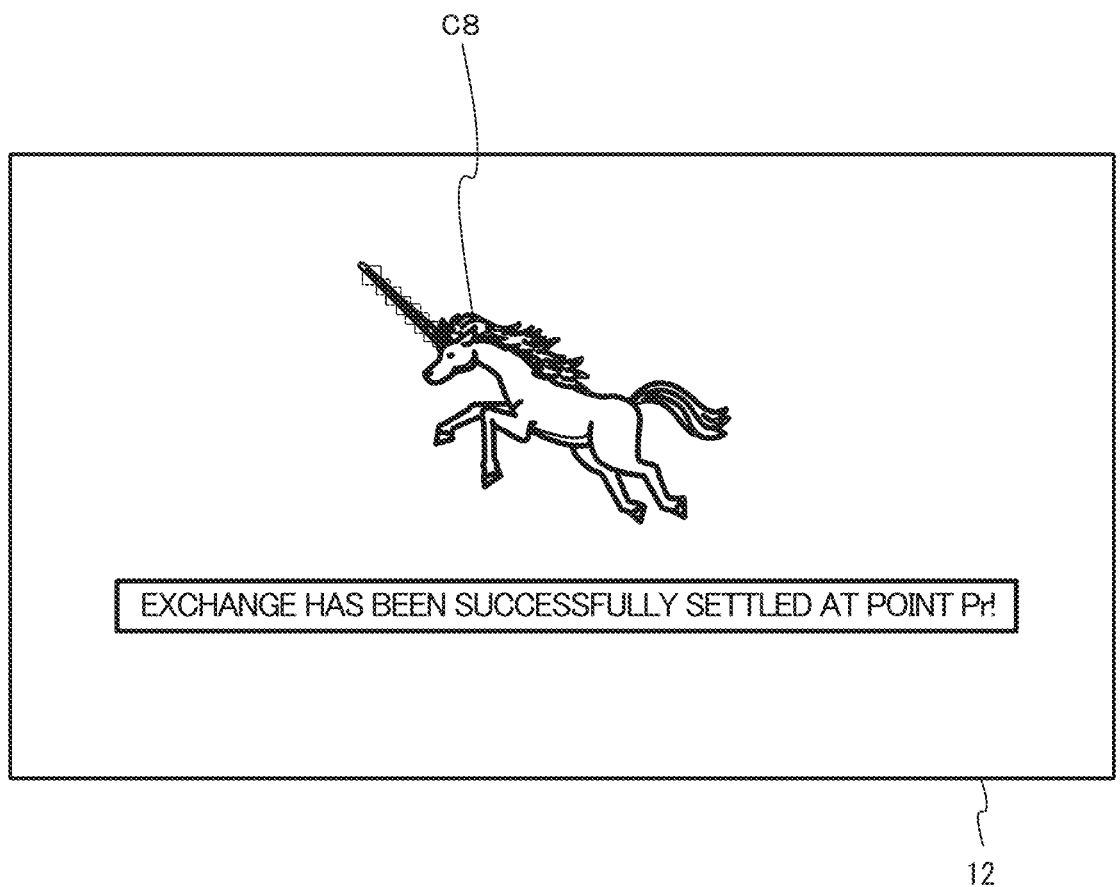
FIG. 16 is a diagram illustrating a non-limiting example of a game image that is displayed in a successful exchange settlement scene in a game process according to a second embodiment.
Figure 17:
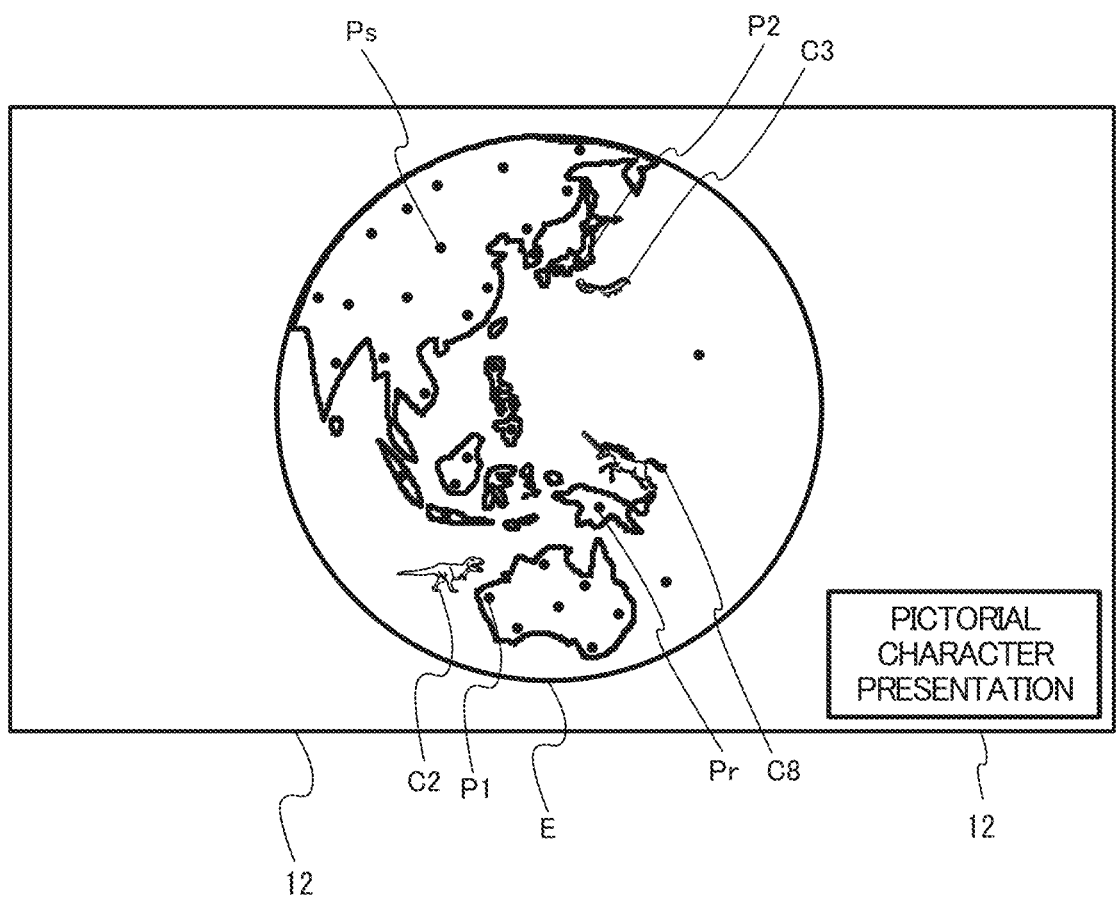
FIG. 17 is a diagram illustrating a non-limiting example of a game image that is displayed in a pictorial representation display situation in a game process according to a second embodiment.

A non-limiting example of a game process (character exchange and display processes) according to a second embodiment will be described with reference to FIGS. 16 and 17. FIG. 16 is a diagram illustrating a non-limiting example of a game image that is displayed in a successful exchange settlement scene in the game process of the second embodiment. FIG. 17 is a diagram illustrating a non-limiting example of a game image that is displayed in a pictorial representation display situation in the game process of the second embodiment.

The game process of the second embodiment is different from the game process of the first embodiment in a method for choosing an exchanging partner. The second embodiment is similar to the first embodiment in the processes that are executed until the third stage of exchange in which an application for exchange is made and the process of giving a reward according to the number of points where exchange has been performed. Therefore, in the description of the game process of the second embodiment, the processes that are executed until the third stage of exchange and the process of giving a reward will not be described again. It should be noted that in the description that follows, the user of a game system 1 designates the point Ps on the globe object E (see FIG. 11) and makes an application for exchange to the server 200 as in the game process of the first embodiment, for example.

In a fourth stage of the exchange in the second embodiment, the server 200 determines whether or not the exchange has been successfully settled, and chooses an exchanging partner. In the second embodiment, if other users have made an application for exchange that designates any point with all points (e.g., 630 points) set as one where an exchanging partner can be chosen, the server 200 chooses an exchanging partner from those users. In other words, in choice of an exchanging partner, another user who has designated a point different from one that has been designated in an application for exchange may be chosen as an exchanging partner. An exchanging partner may be chosen at random as a non-limiting example. In that case, an application for exchange of characters is valid during a valid exchange period that is a predetermined period of time from the time that the exchange application is made. If an exchanging partner is found during the valid exchange period, exchange with the exchanging partner is successfully settled.

When a first user of a game system 1 makes an application for exchange and then the server 200 receives the thing-to-be-exchanged information data I1, the server 200 sets an uploaded character of the first user at a designated point based on the thing-to-be-exchanged information data I1, and stores the character into the storage unit 203. If at least one character of other users has been set at any of all points or of all points excluding a point(s) designated by the first user as points to be combined for exchange, the server 200 chooses a character of a second user that is to be exchanged for the uploaded character of the first user, and successfully settles exchange. If exchange has been successfully settled, the server 200 transmits, to the game system 1 of the first user, the thing-to-be-exchanged information data I2 including at least information indicating a character for which the second user made an application for exchange and information indicating a point designated by the second user in the application for exchange, which notifies the first user of successful settlement of the exchange. The server 200 also transmits, to the game system 1 of the second user, the thing-to-be-exchanged information data I1 including at least information indicating a character for which the first user made an application for exchange and information indicating a point designated by the first user in the application for exchange, which notifies the second user of successful settlement of the exchange. Thereafter, the server 200 deletes, from the storage unit 203, information related to the first user's character and the second user's character involved in the application for exchange.

If no other users' characters have been set at any of all points or of all points excluding a point designated by the first user, and the valid exchange period has expired, the server 200 determines that exchange for the uploaded character of the first user has not been successfully settled. If the exchange has not been successfully settled, the server 200 transmits, to the game system 1 of the first user, unsuccessful exchange settlement data indicating that the exchange has not been successfully settled. Thereafter, the server 200 deletes, from the server 200, information related to the first user's character involved in the application for exchange.

In a fifth stage of the exchange in the second embodiment, the user of the game system 1 is notified of whether or not the exchange has been successfully settled. When receiving, from the server 200, the thing-to-be-exchanged information data I indicating that the exchange has been successfully settled, the game system 1 displays, on the display 12, an image that notifies the user of successful settlement of the exchange. For example, as illustrated in FIG. 16, if the exchange of characters has been successfully settled, the display 12 displays an image showing a character (character C8 in the non-limiting example of FIG. 16) obtained from another user by the exchange and an image that notifies the user of a point where the exchange has been successfully settled (point Pr different from the point Ps designated by the user in the exchange, in the non-limiting example of FIG. 16). Thereafter, the game system 1 puts the character that has been exchanged for one of another user into a state that that character is no longer possessed by the user. The game system 1 also adds the character newly obtained from the second user by the exchange, as a character that can be used in a game, and manages information indicating the point designated by the second user in the exchange for the character, in association with the character.

Otherwise, when receiving, from the server 200, unsuccessful exchange settlement data indicating that the exchange has not been successfully settled, the game system 1 displays, on the display 12, an image that notifies the user of unsuccessful settlement of the exchange.

In the game process of the second embodiment, as in the first and second display examples of the first embodiment, a character that has been obtained from an exchanging partner by the exchange can be displayed. For example, as illustrated in FIG. 17, each character that has been obtained by exchange is displayed on the globe object E at a place designated by an exchanging partner for the character. In the non-limiting example of the game image of FIG. 17, a character C8 that has been obtained by the exchange in which the user has designated the point Ps as described above is displayed on the globe object E in the vicinity of the point Pr, which is different from the designated point Ps. In addition, a character C2 for which another exchange has been successfully settled at the point P1 is displayed on the globe object E in the vicinity of the point P1. In addition, a character C3 for which another exchange has been successfully settled at the point P2 is displayed on the globe object E in the vicinity of the point P2. Thus, even in the second embodiment, a character obtained by successfully settled exchange at a point on the globe object E is displayed in the vicinity of that point, which can provide a pictorial character representation that shows characters already obtained by exchange and places where the characters have been obtained.

It should be noted that as another non-limiting example of the method for choosing an exchanging partner in the second embodiment, a character most recently stored in the storage unit 203 may be designated. In that case, a character transmitted when exchange has been successfully settled is most recently stored in the storage unit 203, i.e., is a newly and most recently stored character. Therefore, a most recently stored character always exists, and therefore, it is not necessary to set the valid exchange period. In addition, a user who provides a received character is different from a user who receives a transmitted character.

Figure 18:
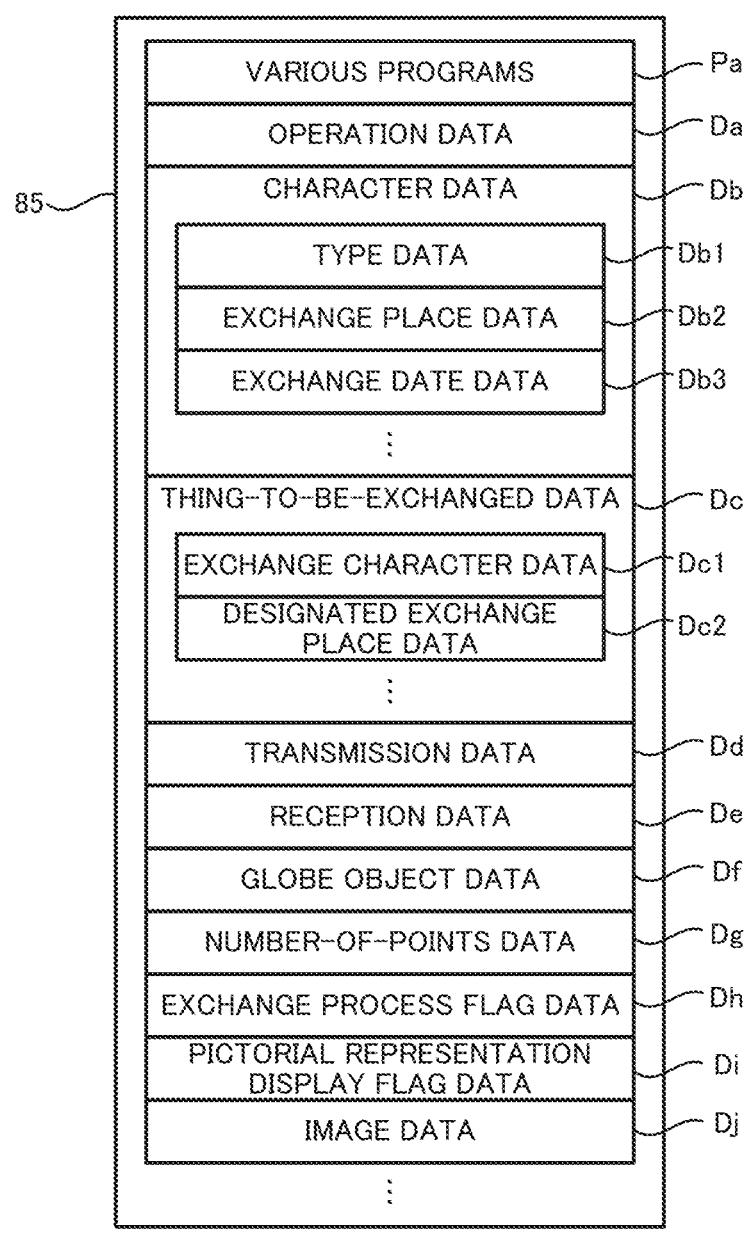
FIG. 18 is a diagram illustrating a non-limiting example of a data area contained in a DRAM 85 of a main body apparatus 2 in the present non-limiting example.

Next, processes executed in the information processing system including the game systems 1 and the server 200 of the present non-limiting example will be described in detail with reference to FIGS. 18-23. It should be noted that FIG. 18 is a diagram illustrating a non-limiting example of a data area contained in the DRAM 85 of the main body apparatus 2 in the present non-limiting example. It should be noted that in addition to the data of FIG. 18, the DRAM 85 also stores data that is used in other processes, which will not be described in detail.

Various programs Pa that are executed in the game system 1 are stored in a program storage area of the DRAM 85. In the present non-limiting example, the programs Pa include an application program (e.g., a game program) for performing information processing based on data obtained from the left controller 3 and/or the right controller 4, and the main body apparatus 2. It should be noted that the programs Pa may be previously stored in the flash memory 84, may be obtained from a storage medium removably attached to the game system 1 (e.g., a predetermined type of storage medium attached to the slot 23) and then stored in the DRAM 85, or may be obtained from another apparatus via a network, such as the Internet, and then stored in the DRAM 85. The processor 81 executes the programs Pa stored in the DRAM 85.

Various kinds of data that are used in processes such as an information process that are executed in the game system 1 are stored in a data storage area of the DRAM 85. In the present non-limiting example, the DRAM 85 stores operation data Da, character data Db, thing-to-be-exchanged information data Dc, transmission data Dd, reception data De, globe object data Df, reward data Dg, exchange process flag data Dh, pictorial representation display flag data Di, image data Dj, and the like.

The operation data Da is obtained, as appropriate, from each of the left controller 3 and/or the right controller 4 and the main body apparatus 2. As described above, the operation data obtained from each of the left controller 3 and/or the right controller 4 and the main body apparatus 2 includes information about an input from each input section (specifically, each button, an analog stick, or a touch panel) (specifically, information about an operation). In the present non-limiting example, operation data is obtained from each of the left controller 3 and/or the right controller 4 and the main body apparatus 2. The obtained operation data is used to update the operation data Da as appropriate. It should be noted that the operation data Da may be updated for each frame that is the cycle of a process executed in the game system 1, or may be updated each time operation data is obtained.

The character data Db, which is related to characters possessed by a user, includes type data Db1, exchange place data Db2, exchange date data Db3, and the like for each character. The type data Db1 indicates a type of a character. The exchange place data Db2 indicates a place (point) where a character was obtained by exchange. The exchange date data Db3 indicates a date and time at which a character was obtained by exchange.

The thing-to-be-exchanged information data Dc, which indicates a thing to be exchanged that is possessed by a user and has been put up for exchange, includes exchange character data Dc1, designated exchange place data Dc2, and the like. The exchange character data Dc1 indicates a character that a user has put up for exchange. The designated exchange place data Dc2 indicates a place (point) that has been designated when a user has put a character up for exchange.

The transmission data Dd is data that is to be transmitted by the game system 1 to another apparatus (e.g., the server 200). The reception data De is data that has been received by the game system 1 from another apparatus (e.g., the server 200).

The globe object data Df indicates a position and orientation (angle of rotation) of the globe object E that are taken when viewed from a virtual camera (viewpoint).

Number-of-points data Dg indicates the number of points (places) that were designated by an exchanging partner(s) in past exchange.

The exchange process flag data Dh indicates an exchange process flag that is set on when an exchange process is being executed. The pictorial representation display flag data Di indicates a pictorial representation display flag that is set on when pictorial representation display is being performed.

The image data Dj is for displaying, on a display screen (e.g., the display 12 of the main body apparatus 2), an image (e.g., an image of a character, an image used in a user interface, an image of a virtual space, a background image, etc.).

Figure 19:
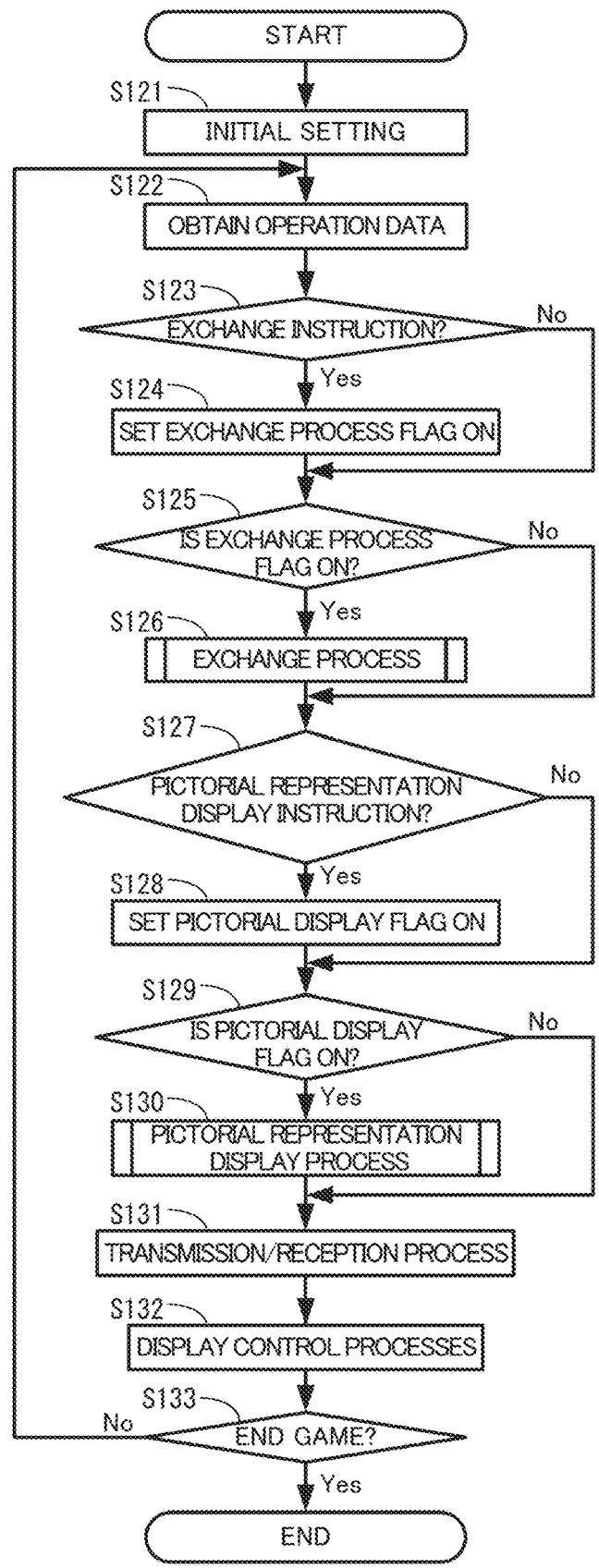
FIG. 19 is a flowchart illustrating a non-limiting example of an information process that is executed in a game system 1.
Figure 20:
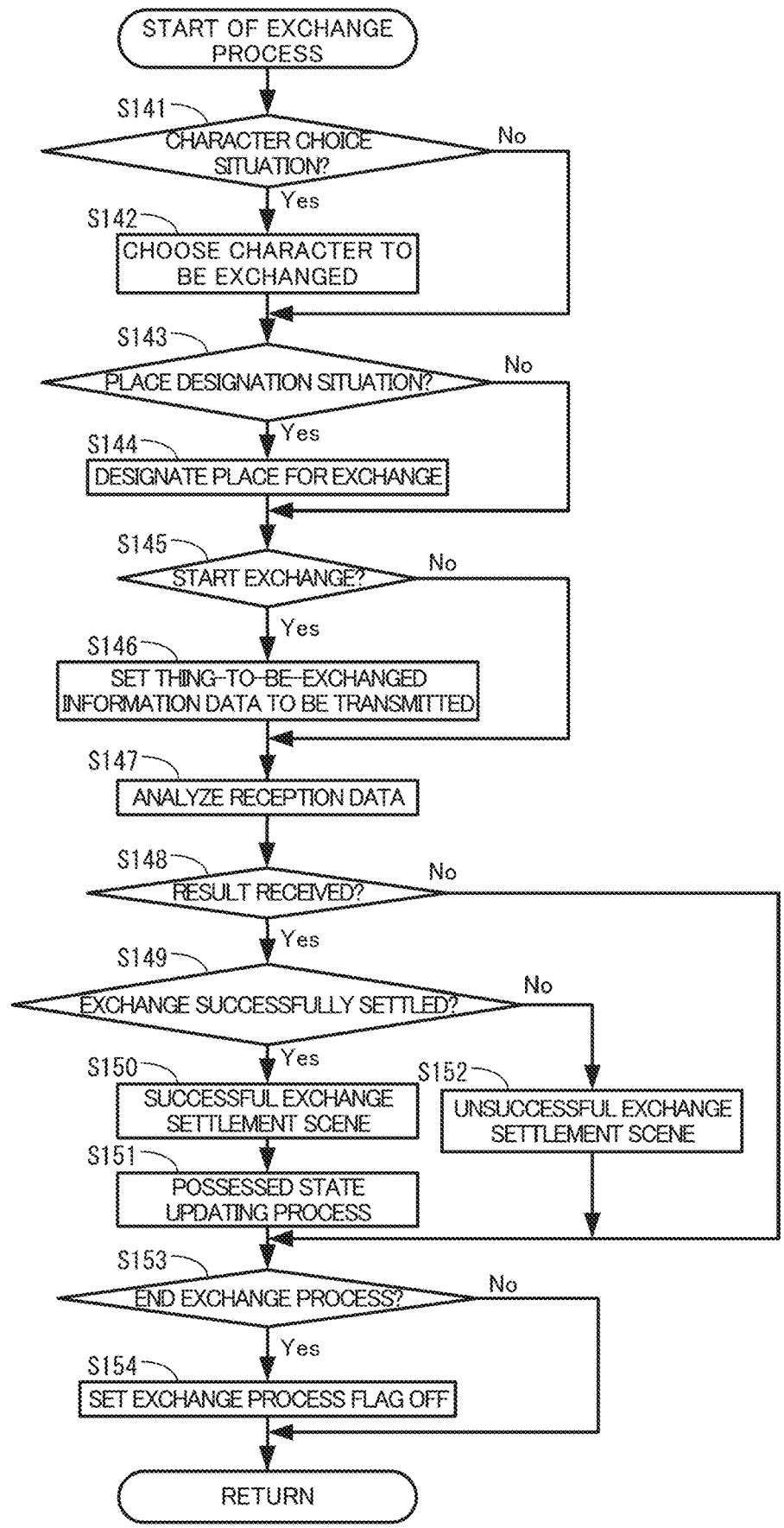
FIG. 20 is a subroutine illustrating a specific non-limiting example of an exchange process that is executed in step S126 of FIG. 19.
Figure 21:
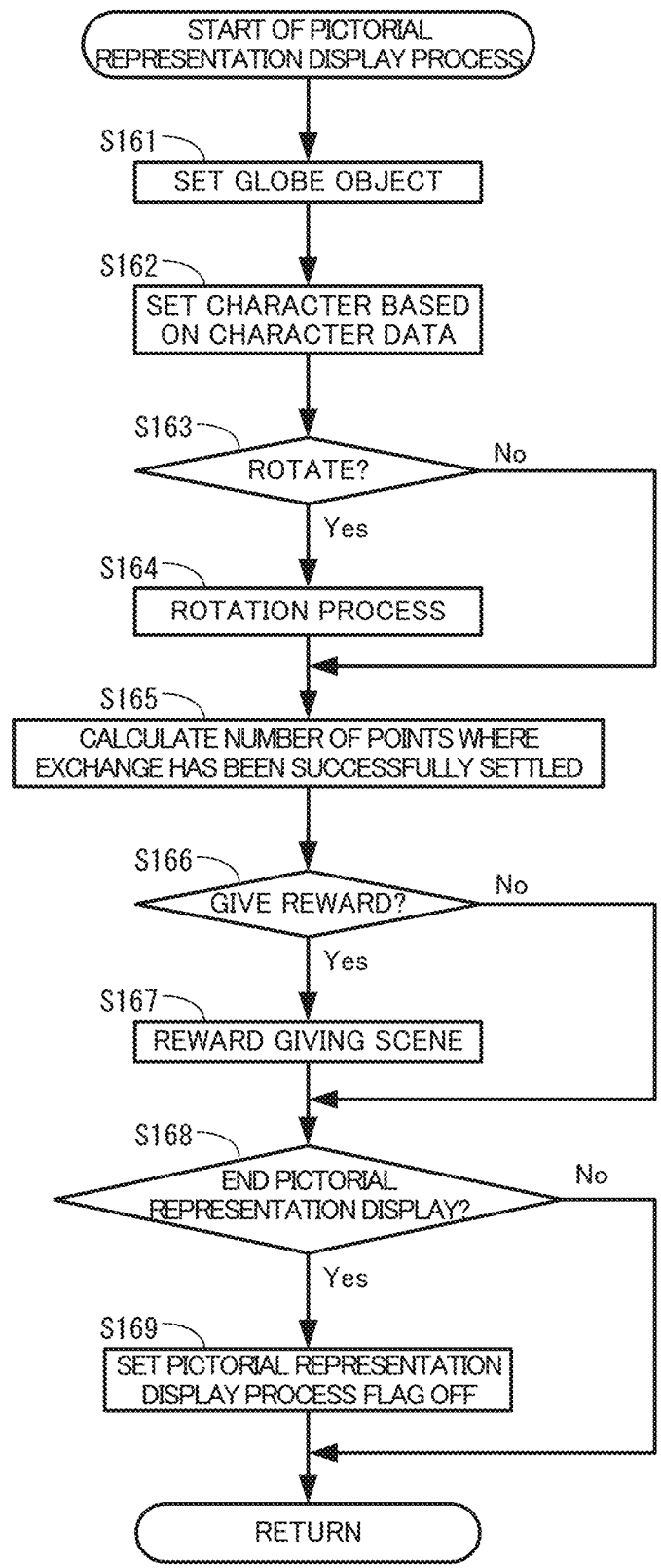
FIG. 21 is a subroutine illustrating a specific non-limiting example of a pictorial representation display process that is executed in step S130 of FIG. 19.

Next, a specific non-limiting example of an information process that is executed in the game system 1 of the present non-limiting example will be described with reference to FIGS. 19-21. FIG. 19 is a flowchart illustrating a non-limiting example of an information process that is executed in the game system 1. FIG. 20 is a subroutine illustrating a specific non-limiting example of an exchange process that is executed in step S126 of FIG. 19. FIG. 21 is a subroutine illustrating a specific non-limiting example of a pictorial representation display process that is executed in step S130 of FIG. 19. In the present non-limiting example, a series of processes illustrated in FIGS. 19-21 are executed by the processor 81 executing a predetermined application program (game program) included in the programs Pa. The information processes of FIGS. 19-21 are started with any suitable timing.

It should be noted that the steps in the flowchart of FIGS. 19-21, which are merely illustrative, may be executed in a different order, or another step may be executed in addition to (or instead of) each step, if a similar effect is obtained. In the present non-limiting example, it is assumed that the processor 81 executes each step of the flowchart. Alternatively, a portion of the steps of the flowchart may be executed by a processor or dedicated circuit other than the processor 81. In addition, a portion of the steps executed by the main body apparatus 2 may be executed by another information processing apparatus that can communicate with the main body apparatus 2 (e.g., the server 200). Specifically, the steps of FIGS. 19-21 may be executed by a plurality of information processing apparatuses including the main body apparatus 2 cooperating with each other.

In FIG. 19, the processor 81 performs initial setting for the information process (step S121), and proceeds to the next step. For example, in the initial setting, the processor 81 initializes parameters for performing processes described below.

Next, the processor 81 obtains operation data from each of the left controller 3, the right controller 4, and/or the main body apparatus 2, and updates the operation data Da (step S122), and proceeds to the next step.

Next, the processor 81 determines whether or not an exchange instruction to exchange characters has been performed, based on the operation data Da (step S123). If the operation data Da indicates the exchange instruction, the processor 81 proceeds to step S124. Otherwise, if the operation data Da does not indicate the exchange instruction, the processor 81 proceeds to step S125.

In step S124, the processor 81 sets the exchange process flag on, and proceeds to step S125. For example, the processor 81 sets the exchange process flag on, and updates the exchange process flag data Dh.

In step S125, the processor 81 determines whether or not the exchange process flag is on, based on the exchange process flag data Dh. If the exchange process flag is on, the processor 81 proceeds step S126. Otherwise, if the exchange process flag is off, the processor 81 proceeds to step S127.

In step S126, the processor 81 executes an exchange process, and proceeds to step S127. The exchange process of step S126 will be described below with reference to FIG. 20.

In FIG. 20, the processor 81 determines whether or not a character should be chosen (step S141). If the operation data Da indicates an instruction to choose a character that is to be put up for exchange, or that an operation is being performed to choose a character, the processor 81 proceeds step S142. Otherwise, if a character should not be chosen, the processor 81 proceeds to step S143.

In step S142, the processor 81 sets a character list image showing options for a character that is to be put up for exchange (see FIG. 10) and thereby prompts the user to choose a character, and executes a process of choosing a character that is to be put up for exchange, according to the user's instruction to choose any character, and proceeds to step S143. For example, the processor 81 chooses a character that is to be put up for exchange from the displayed character list image, based on the operation data Da, and updates the exchange character data Dc1 with the chosen character. It should be noted that a computer that causes a player to designate an item or character that is to be transmitted to another information processing apparatus for exchange, according to an operation input, corresponds to, as a non-limiting example, the processor 81 performing step S142.

In step S143, the processor 81 determines whether or not a place for exchange should be designated. If the operation data Da indicates an instruction to designate a place or an operation is being performed to designate a place, the processor 81 proceeds to step S144. Otherwise, if a place should not be designated, the processor 81 proceeds to step S145.

In step S144, the processor 81 sets the globe object E (see FIG. 11), on which a place (point) can be designated and thereby prompts the user to designate a place, and executes a process of designating a place for exchange according to the user's instruction to designate any place, and proceeds to step S145. For example, the processor 81 chooses one from a plurality of points set on the globe object E, based on the operation data Da, and updates the designated exchange place data Dc2 with the chosen point. It should be noted that a computer that sets a place designated by a player on a predetermined user interface according to an operation input corresponds to, as a non-limiting example, the processor 81 performing step S144.

In step S145, the processor 81 determines whether or not to start exchange. For example, if the operation data Da indicates the user's instruction to start exchange, the result of the determination by the processor 81 in step S145 is positive. If the processor 81 determines to start exchange, the processor 81 proceeds to step S146. Otherwise, if the processor 81 does not determine to start exchange, the processor 81 proceeds to step S147.

In step S146, the processor 81 sets thing-to-be-exchanged information data to be transmitted, and proceeds to step S147. For example, based on the thing-to-be-exchanged information data Dc, the processor 81 creates thing-to-be-exchanged information data including information about a character that is to be put up for exchange by the user and information about a designated place for exchange, and sets the thing-to-be-exchanged information data as the transmission data Dd to be transmitted to the server 200. It should be noted that the thing-to-be-exchanged information data thus created is transmitted to the server 200 by execution of a transmission and reception process of step S131 described below. The execution of step S146 may trigger setting by the processor 81 of a scene image indicating a state in which the result of exchange from the server 200 is being waited for, and the setting of displaying the scene image may be performed until the result of determination in step S148 described below is positive. It should be noted that a computer that transmits information about a place designated by a player and information about an item or character designated by a player, as information about a thing to be exchanged, to another information processing apparatus for exchange corresponds to, as a non-limiting example, the processor 81 performing step S146.

In step S147, the processor 81 analyzes reception data received from another apparatus (e.g., the server 200), based on the reception data De, and proceeds to the next step.

Next, the processor 81 determines whether or not the processor 81 has received reception data indicating the result of exchange, based on the result of the analysis in step S147 (step S148). For example, if the processor 81 has received, from the server 200, thing-to-be-exchanged information data of an exchanging partner indicating successful settlement of exchange or unsuccessful exchange settlement data indicating unsuccessful settlement of exchange, the result of the determination by the processor 81 in step S148 is positive. If the processor 81 has received reception data indicating the result of exchange, the processor 81 proceeds to step S149. Otherwise, if the processor 81 has not received reception data indicating the result of exchange, the processor 81 proceeds to step S153.

In step S149, the processor 81 determines whether or not exchange has been successfully settled. For example, if the processor 81 has received, from the server 200, thing-to-be-exchanged information data of an exchanging partner indicating that exchange has been successfully settled, the result of the determination by the processor 81 in step S149 is positive. Otherwise, if the processor 81 has received, from the server 200, unsuccessful exchange settlement data indicating unsuccessful settlement of exchange, the result of the determination by the processor 81 in step S149 is negative. Thereafter, if exchange has been successfully settled, the processor 81 proceeds to step S150. Otherwise, if exchange has not been successfully settled, the processor 81 proceeds to step S152.

In step S150, the processor 81 sets a successful exchange settlement scene, and proceeds to the next step. For example, the processor 81 provides a successful exchange settlement scene by setting an image for notifying the user of a character obtained from an exchanging partner and a point designated by the exchanging partner, based on the thing-to-be-exchanged information received from the server 200 (see FIG. 12).

Next, the processor 81 executes a process of updating a character possession state (step S151), and proceeds to step S153. For example, the processor 81 puts a character newly obtained from an exchanging partner into a state in which the character is possessed by the user (e.g., a state in which the character can be used in a game, i.e., the character is allowed to appear in the virtual space and perform an action), and adds new character data Db using the type of the character, a point designated by the exchanging partner, and a date and time at which exchange was successfully settled. The processor 81 also puts a character that was put up for exchange to an exchanging partner into a state in which the character is no longer possessed by the user (the character is not allowed to be used in the game), and keeps the character data Db of the character unchanged.

Meanwhile, in step S152, the processor 81 sets an unsuccessful exchange settlement scene, and proceeds to step S153. For example, the processor 81 provides an unsuccessful exchange settlement scene by setting an image for notifying the user of unsuccessful settlement of exchange, based on the unsuccessful exchange settlement data received from the server 200. It should be noted that a computer that receives information about a place designated by an exchanging partner and information about an item or character designated by the exchanging partner, as information about a thing to be exchanged, from another information processing apparatus for exchange corresponds to, as a non-limiting example, the processor 81 performing steps S147-S152.

In step S153, the processor 81 determines whether or not to end the exchange process. For example, when the processor 81 receives an exchange result from the server 200 and ends the exchange scene or when the user performs an operation of ending the exchange process, the result of the determination in step S153 is positive. If the processor 81 determines to end the exchange process, the processor 81 proceeds to step S154. Otherwise, if the processor 81 determines to continue the exchange process, the processor 81 ends the subroutine.

In step S154, the processor 81 sets the exchange process flag off, and ends the subroutine. For example, the processor 81 sets the exchange process flag off, and updates the exchange process flag data Dh. It should be noted that if step S154 is being executed in an application for exchange to the server 200, the processor 81 may set, in the transmission data Dd, exchange application cancellation data indicating cancellation of the exchange application.

Referring back to FIG. 19, after the exchange process of step S126 or after the determination in step S125 has resulted in being negative, the processor 81 determines, based on the operation data Da, whether or not an instruction to perform pictorial representation display of a character obtained by exchange has been performed (step S127). If the operation data Da indicates the pictorial representation display instruction, the processor 81 proceeds to step S128. Otherwise, if the operation data Da does not indicate the pictorial representation display instruction, the processor 81 proceeds to step S129.

In step S128, the processor 81 sets the pictorial representation display flag on, and proceeds to step S129. For example, the processor 81 sets the pictorial representation display flag on, and updates the pictorial representation display flag data Di.

In step S129, the processor 81 determines whether or not the pictorial representation display flag is on, based on the pictorial representation display flag data Di. If the pictorial representation display flag is on, the processor 81 proceeds to step S130. Otherwise, if the pictorial representation display flag is off, the processor 81 proceeds to step S131.

In step S130, the processor 81 executes a pictorial representation display process, and proceeds to step S131. The pictorial representation display process of step S130 will be described below with reference to FIG. 21. It should be noted that a computer that performs first user interface display in which at least one item or character that has been obtained as a thing to be exchanged from an exchanging partner by exchange is displayed on a user interface at a place designated by the exchanging partner, or is displayed by choosing the place, corresponds to, as a non-limiting example, the processor 81 performing step S130.

In FIG. 21, the processor 81 sets the globe object E (step S161), and proceeds to the next step. For example, the processor 81 executes a process of disposing the globe object E in the virtual space based on a position and orientation (angle of rotation) indicated by the globe object data Df (see FIGS. 13-15 and 17).

Next, the processor 81 sets a character that has been obtained by exchange on the globe object E (step S162), and proceeds to the next step. For example, the processor 81 sets, based on the character data Db, each character that has been obtained by exchange, at a corresponding exchange place on the globe object E. For example, when a character is displayed using the first display example (see FIGS. 13, 14, and 17), the processor 81 disposes each character at a place on the globe object E corresponding to an exchange place set for the character.

Next, the processor 81 determines whether or not to rotate the globe object E (step S163). For example, if the operation data Da indicates that an instruction to rotate the globe object E has been performed, the result of the determination by the processor 81 in step S163 is positive. If the processor 81 determines to rotate the globe object E, the processor 81 proceeds to step S164. Otherwise, if the processor 81 does not determine to rotate the globe object E, the processor 81 proceeds to step S165.

In step S164, the processor 81 performs a rotation process, and proceeds to step S165. For example, the processor 81 updates the globe object data Df by performing control to rotate the globe object E in the virtual space, revolve the viewpoint of the virtual camera, or the like, according to the user's operation indicated by the operation data Da, so as to provide a positional relationship in which the globe object E is rotated relative to the viewpoint of the virtual camera.

In step S165, the processor 81 calculates the number of points (number of places) where exchange of characters has been successfully settled, and proceeds to the next step. For example, the processor 81 calculates the number of points by adding up all points indicated by the exchange place data Db2 set for characters (if the same point is indicated by the exchange place data Db2 for two or more characters, the increment in the number of points is one), and updates the number-of-points data Dg.

Next, the processor 81 determines whether or not to give a reward to the user, based on the number of points calculated in step S165 (step S166). For example, if the number of points indicated by the number-of-points data Dg has reached a predetermined value (e.g., each time the number of points where exchange has been successfully settled increases by 100), the result of the determination by the processor 81 in step S166 is positive. If the processor 81 determines to give a reward to the user, the processor proceeds to step S167. Otherwise, if the processor 81 does not determine to give a reward to the user, the processor proceeds to step S168.

In step S167, the processor 81 gives a predetermined reward to the user, and proceeds to step S168. For example, the processor 81 gives the user a predetermined reward that is advantageous to progression of the game, and allows the user to use the reward in the game. It should be noted that the processes of step S165-S167 to give a reward to the user according to the number of points where exchange has been successfully settled may be executed in the exchange process (e.g., after step S151).

In step S168, the processor 81 determines whether or not to end the pictorial representation display process. For example, if the user has performed an operation of ending the pictorial representation display process, the result of the determination by the processor 81 in step S168 is positive. If the processor 81 determines to end the pictorial representation display process, the processor 81 proceeds to step S169. Otherwise, if the processor 81 determines to continue the pictorial representation display process, the processor 81 ends the subroutine.

In step S169, the processor 81 sets the pictorial representation display flag off, and ends the subroutine. For example, the processor 81 sets the pictorial representation display flag off, and updates the pictorial representation display process flag data Di.

Referring back to FIG. 19, after the pictorial representation display process of step S130 or after the determination of step S129 has resulted in being negative, the processor 81 executes a transmission/reception process (step S131), and proceeds to the next step. For example, the processor 81 transmits, to the server 200, data set in the transmission data Dd together with information indicating a user who sends the data. The processor 81 also stores data received from the server 200 into the reception data De.

Next, the processor 81 executes a display control process, and proceeds to the next step. For example, the processor 81 performs control to generate and display a game image on the display 12 based on the results of steps S121-S132 and the like.

Next, the processor 81 determines whether or not to end the game process (step S134). The condition for ending the game process in step S134 is, for example, that the condition for ending the game process is satisfied, that the user performs an operation of ending the game process, etc. If the processor 81 does not determine to end the game process, the processor 81 returns to and repeats step S122. If the processor 81 determines to end the game process, the processor 81 ends the process of the flowchart. Thereafter, steps S122-S134 are repeatedly executed until the processor 81 determines, in step S134, to end the game process.

Figure 22:
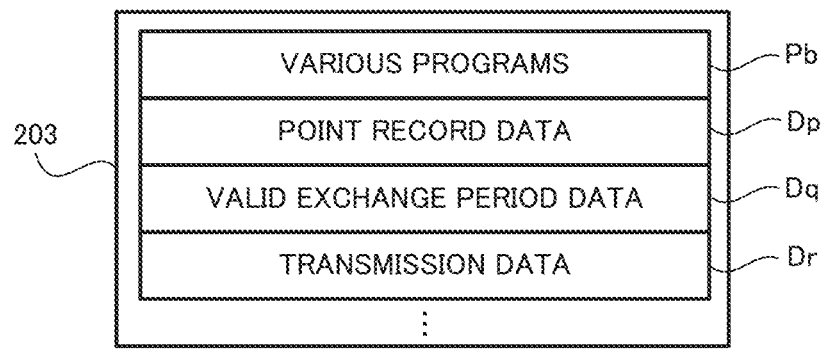
FIG. 22 is a diagram illustrating a non-limiting example of main data and programs stored in a storage unit 203 of a server 200.

Next, data and programs stored in the server 200 will be described with reference to FIG. 22. FIG. 22 is a diagram illustrating a non-limiting example of main data and programs stored in the storage unit 203 of the server 200.

As illustrated in FIG. 22, point record data Dp, valid exchange period data Dq, transmission data Dr, and the like, are stored in a data storage area of the storage unit 203. It should be noted that the storage unit 203 stores, in addition to data included in the information of FIG. 22, data required for processes of the server 200 (e.g., processes involved in logging in, data management, and data transmission), and the like. Various programs Pb for implementing the above processes are also stored in a program storage area of the storage unit 203.

The point record data Dp indicates a user and character set for each point designated by a user in an application for exchange.

The valid exchange period data Dq indicates the remaining time of the valid exchange period for each user applying for exchange.

The transmission data Dr indicates transmission data that is to be transmitted to the game system 1.

Figure 23:
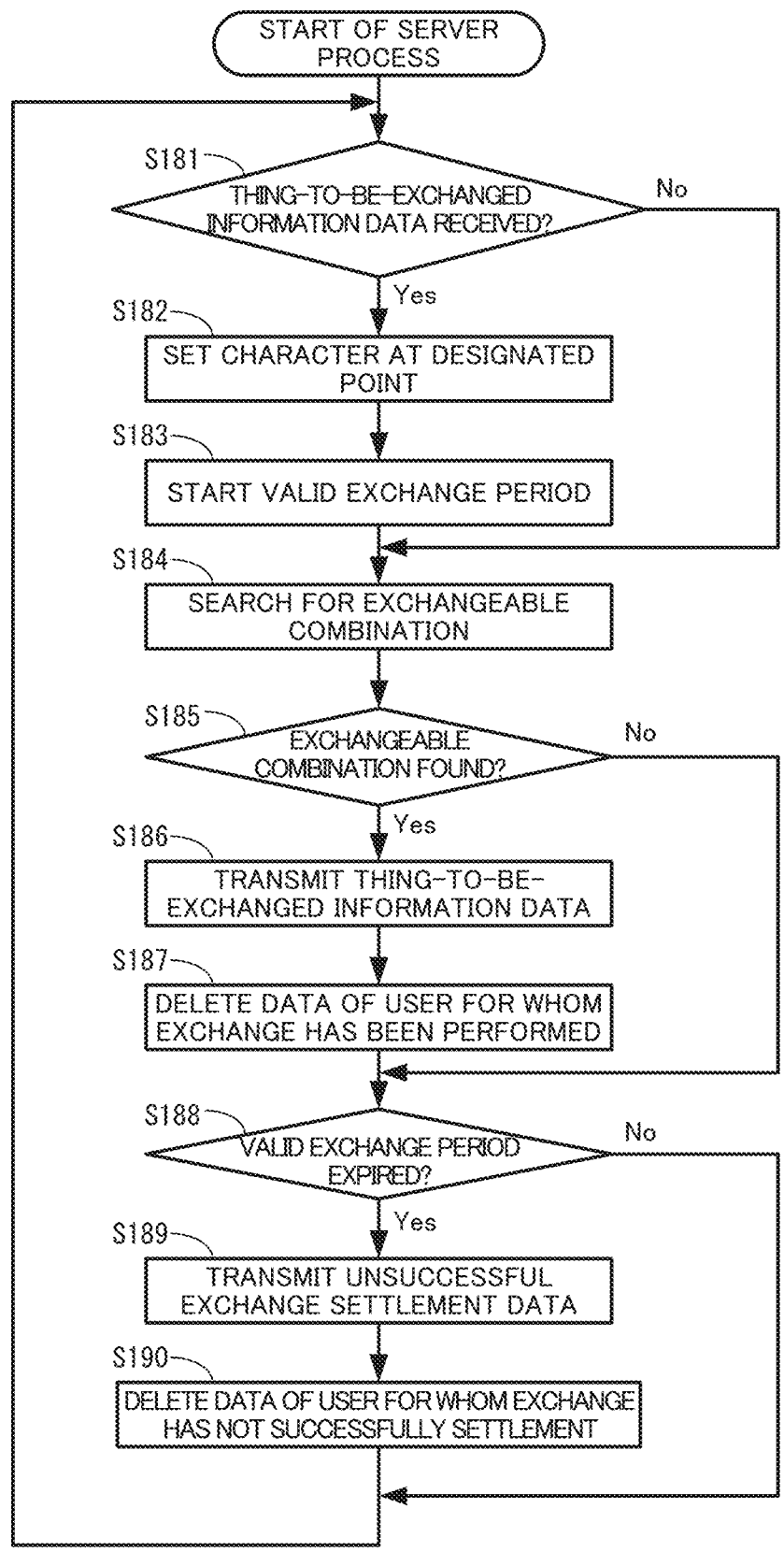
FIG. 23 is a flowchart illustrating a non-limiting example of a process that is executed in a server 200.

Next, processes that are executed in the server 200 will be described below with reference to FIG. 23. FIG. 23 is a flowchart illustrating a non-limiting example of processes that are executed in the server 200. Here, in the flowchart of FIG. 23, of the processes of the information processing system, a process of exchanging characters between users will be mainly described, and other processes that are not directly involved with those processes will not be described in detail. In FIG. 23, each step that is executed by the control unit 202 is abbreviated to 'S'.

It should be noted that the steps in the flowchart of FIG. 23, which are merely illustrative, may be executed in a different order, or another step may be executed in addition to and/or instead of each step, if a similar effect is obtained. In the present non-limiting example, it is assumed that the control unit 202 (CPU) executes each step of the flowchart. Alternatively, a portion of the steps of the flowchart may be executed by the control unit 202 (CPU), and the other portions may be executed by a processor or dedicated circuit other than the control unit 202 (CPU). In addition, all the steps of the flowchart may be executed by a processor or dedicated circuit other than the control unit 202 (CPU).

In FIG. 23, the control unit 202 of the server 200 determines whether or not the server 200 has received thing-to-be-exchanged information data indicating an application for exchange from a game system 1 (step S181). If the control unit 202 has received the thing-to-be-exchanged information data from a game system 1, the control unit 202 proceeds to step S182. Otherwise, if the control unit 202 has not received the thing-to-be-exchanged information data from a game system 1, the control unit 202 proceeds to step S184.

In step S182, the control unit 202 sets the user and a character put up for exchange at a point designated in an application for exchange, and proceeds to the next step. For example, the control unit 202 sets a user of a game system 1 who has transmitted the thing-to-be-exchanged information data and a character put up for exchange, at a designated point indicated by the received thing-to-be-exchanged information data, and adds the setting data to the point record data Dp.

Next, the control unit 202 executes a process of starting the valid exchange period of the user who has sent and made an application for exchange (step S183), and proceeds to step S184. For example, the control unit 202 sets the valid exchange period of a user of a game system 1 who has sent thing-to-be-exchanged information data to a predetermined period of time, and stores the valid exchange period into the valid exchange period data Dq. In the following processes, the control unit 202 reduces the period of time indicated by the valid exchange period data Dq according to an elapsed time.

It should be noted that if the control unit 202 receives data indicating cancellation of exchange from the game system 1 after the application for exchange, the control unit 202 removes the record data and valid exchange period data of the user who has sent and made an application for cancellation of the exchange from the point record data Dp and the valid exchange period data Dq, respectively.

In step S184, the control unit 202 searches for an exchangeable combination, and proceeds to the next step. For example, in the case where the method for choosing an exchanging partner in the first embodiment is used, the control unit 202 refers to users and characters recorded in the point record data Dp, and if a plurality of users who are putting different characters up for exchange are set at the same point, the control unit 202 determines that the characters are an exchangeable combination. Alternatively, in the case where the method for choosing an exchanging partner in the second embodiment is used, the control unit 202 refers to users and characters recorded in the point record data Dp, and if a plurality of users who are putting different characters up for exchange are set at different points or the same point, the control unit 202 determines that the characters are an exchangeable combination.

Next, in step S184, the control unit 202 determines that any exchangeable combination has been detected (step S185). If at least one exchangeable combination has been detected, the control unit 202 proceeds to step S186. Otherwise, if no exchangeable combination has been detected, the control unit 202 proceeds to step S188.

In step S186, the control unit 202 sets a detected exchangeable combination as a pair for exchange, and transmits thing-to-be-exchanged information data to the users of the pair, and proceeds to the next step. For example, if the combination of a first user and a second user is a pair for exchange, the control unit 202 sets, in the transmission data Dr, thing-to-be-exchanged information data including information about a character that the first user has put up for exchange and information about a point designated by the first user, and transmits the transmission data Dr to the second user. The control unit 202 also sets, in the transmission data Dr, thing-to-be-exchanged information data including information about a character that the second user has put up for exchange and information about a point designated by the second user, and transmits the transmission data Dr to the first user.

Next, the control unit 202 deletes data of users for whom exchange has been performed (step S187), and proceeds to step S188. For example, when exchange has been performed on the combination of a first and a second user, the control unit 202 deletes record data of the first and second users, from the point record data Dp and the valid exchange period data Dq.

In step S188, the control unit 202 determines whether or not the valid exchange period has expired for any user. For example, if the valid exchange period data Dq indicates that there is a user for whom the valid exchange period has expired, the result of the determination by the control unit 202 in step S188 is positive. If there is a user for whom the valid exchange period has expired, the control unit 202 proceeds to step S189. Otherwise, if there is no user for whom the valid exchange period has expired, the control unit 202 returns to and repeats step S181.

In step S189, the control unit 202 transmits unsuccessful exchange settlement data to a user for whom the valid exchange period has expired, and proceeds to the next step. For example, the control unit 202 sets, in the transmission data Dr, unsuccessful exchange settlement data indicating that exchange has not been successfully settled, and transmits the transmission data Dr to a user for whom it has been determined in step S188 that the valid exchange period expired.

Next, the control unit 202 deletes data of the user for whom exchange has not been successfully settled (step S190), and returns to and repeats step S181. For example, the control unit 202 deletes record data of the user for whom it has been determined that the valid exchange period expired, from the point record data Dp and the valid exchange period data Dq.

It should be noted that in the case of the non-limiting example in which a first user receives a character most recently stored in the storage unit 203 from a second user (exchanging partner who has set the character), it is determined whether or not exchange is allowed, by determining whether or not at least one record of the point record data Dp is stored in the storage unit 203, instead of searching the combinations. If at least one record of the point record data Dp is stored in the storage unit 203, the most recently stored record of the point record data Dp is set as the thing-to-be-exchanged information data of the exchanging partner (second user) in the transmission data Dr, which is in turn transmitted to the first user as an exchanging partner or receiver. Thereafter, record data based on the thing-to-be-exchanged information data transmitted by the first user is stored as a newly and most recently stored record of the point record data Dp in the storage unit 203. Therefore, in this case, it is no longer necessary to set the valid exchange period, and therefore, it is also no longer necessary to store the valid exchange period data Dq. It should be noted that the record data transmitted from the server 200 on which the thing-to-be-exchanged information data is based may be deleted from the point record data Dp for each transmission, or alternatively, continues to be stored in the point record data Dp until a predetermined period of time has passed since the transmission. In the former case, the record data is inevitably deleted from the point record data Dp each time the record data is transmitted to a user, and therefore, a single piece of record data stored in the point record data Dp may be set as the most recent record of the point record data Dp in the thing-to-be-exchanged information data of the exchanging partner (second user). Alternatively, in the former case, the record data may be invalidated in the point record data Dp, which may be defined as being deleted from the point record data Dp, and may be maintained as a backup in the server 200.

Thus, in the present non-limiting example, when users exchange characters, a scene is displayed using not only information indicating the types and attributes of the characters, but also information about a place that is designated by an exchanging partner when the characters are put up for exchange. Therefore, the use of further additional information about a character can provide an incentive to exchange characters.

Although in the above non-limiting examples, the process of choosing an exchanging partner is executed in the server 200, that process may be executed in the game system 1. The game system 1 makes an application for exchange, then receives, from the server 200, data related to exchanging partners (e.g., the point record data Dp) as of the exchange application, and chooses an exchanging partner based on that data. In that case, an exchanging partner who has designated the same point that has been designated in the exchange application as in the first embodiment may be chosen, or alternatively, an exchanging partner may be chosen at random as in the second embodiment. In either case, the result of the choice of an exchanging partner performed by the game system 1 is temporarily transmitted to the server 200, in which record data is checked and updated. It should be noted that even in the case where the game system 1 chooses an exchanging partner, the result of the choice of an exchanging partner performed by the game system 1 may be transmitted to the server 200, and thereafter, thing-to-be-exchanged information data may be newly transmitted from the server 200 to the game system 1, so that exchange may be successfully settled.

In the present non-limiting example, an application for exchange is made without designating an exchanging partner, a character that a user desires to obtain by exchange, or the like. Alternatively, in the case where the process of choosing an exchanging partner is executed in the game system 1, the user of the game system 1 may designate an exchanging partner or a character. For example, a list of currently possible exchanging partners and things to be exchanged (characters) based on data related to exchanging partners received from the server 200 is presented to the user using a predetermined user interface (e.g., the globe object E). Specifically, based on data received from the server 200, characters for which exchange has not yet been performed are displayed at respective points designated by exchanging partners on the user interface. Thereafter, one may be chosen from the displayed characters according to the user's operation, whereby an exchanging partner may be chosen by the game system 1. Even in that case, the result of the choice of an exchanging partner performed by the game system 1 is temporarily transmitted to the server 200, in which record data is checked and updated. It should be noted that even in the case where the game system 1 chooses an exchanging partner according to the user's choice, the result of the choice of an exchanging partner performed by the game system 1 may be transmitted to the server 200, and thereafter, thing-to-be-exchanged information data may be newly transmitted from the server 200 to the game system 1, so that exchange may be successfully settled.

In an application for exchange, conditions for exchange desired by the user such as a desired character and a desired exchange place of an exchanging partner may be able to be designated. In that case, information indicating the type and attribute of a character that the user desires to exchange and information about a place desired as an exchanging partner are added to thing-to-be-exchanged information data that is transmitted to the server 200 when an application for exchange is made. Thereafter, the process of choosing an exchanging partner based on exchange settlement conditions additionally including the user's desired exchange conditions is executed in the server 200, and therefore, exchange can be implemented, taking the user's desired exchange conditions into account.

Although in the foregoing, a plurality of game systems 1 exchange data through the server 200 by way of example, the game systems 1 may exchange data by directly communicating with each other. In that case, data management that is performed in the server 200 and a process that is executed by the server 200 may be carried out by a representative one of the plurality of game systems 1, or may be carried out by the plurality of game systems 1 in a distributed manner. Thus, another information processing apparatus that communicates with a game system 1 in order to implement the above non-limiting examples may be either another game system 1 or the server 200.

It should be noted that the game system 1 may be any suitable apparatus, and may be an information processing apparatus such as a handheld game apparatus, or any suitable handheld electronic apparatus (a personal digital assistant (PDA), mobile telephone, personal computer, camera, tablet computer, etc.). In that case, an input apparatus for performing an operation of causing a player character PC to perform an action may be, instead of the left controller 3, the right controller 4, or the touch panel 13, another controller, mouse, touchpad, touch panel, trackball, keyboard, directional pad, slidepad, etc.

In the foregoing, the information processes (game processes) are performed in the game system 1 and the server 200. Alternatively, at least a portion of the process steps may be performed in another apparatus. For example, when the game system 1 and the server 200 can also communicate with another apparatus (e.g., another server, another image display apparatus, another game apparatus, another mobile terminal, etc.), the process steps may be executed in cooperation with the second apparatus. By thus causing another apparatus to perform a portion of the process steps, a process similar to the above process can be performed. The above information process may be executed by a single processor or a plurality of cooperating processors included in an information processing system including at least one information processing apparatus. In the above non-limiting example, the information processes can be performed by the processor 81 of the game system 1 and the control unit 202 of the server 200 executing predetermined programs. Alternatively, all or a portion of the above processes may be performed by a dedicated circuit included in the game system 1 and/or the server 200.

Here, according to the above non-limiting variation, the present non-limiting example can be implanted in a so-called cloud computing system form or distributed wide-area and local-area network system forms. For example, in a distributed local-area network system, the above process can be executed by cooperation between a stationary information processing apparatus (a stationary game apparatus) and a mobile information processing apparatus (handheld game apparatus). It should be noted that, in these system forms, each of the above steps may be performed by substantially any of the apparatuses, and the present non-limiting example may be implemented by assigning the steps to the apparatuses in substantially any manner.

The order of steps, setting values, conditions for determination, etc., used in the above information process are merely illustrative, and of course, other order of steps, setting values, conditions for determination, etc., may be used to implement the present non-limiting example.

The above programs may be supplied to the game system 1 and the server 200 not only through an external storage medium, such as an external memory, but also through a wired or wireless communication line. The program may be previously stored in a non-volatile storage device in the game system 1. Examples of an information storage medium storing the program include non-volatile memories, and in addition, CD-ROMs, DVDs, optical disc-like storage media similar thereto, and flexible disks, hard disks, magneto-optical disks, and magnetic tapes. The information storage medium storing the program may be a volatile memory storing the program. Such a storage medium may be said as a storage medium that can be read by a computer, etc. (computer-readable storage medium, etc.). For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of the present non-limiting example and common technical knowledge. It should be understood throughout the present specification that expression of a singular form includes the concept of its plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which the present non-limiting example pertain. If there is any inconsistency or conflict, the present specification (including the definitions) shall prevail.

As described above, the present non-limiting example is applicable as a game program, game system, game apparatus, game processing method, and the like that are capable of providing an incentive to exchange items or characters by using further additional information about a thing to be exchanged.

What is claimed is:

1. A non-transitory computer-readable storage medium having stored therein a game program that when executed by a processor of an information processing apparatus, causes the processor to communicate with another information processing apparatus and exchange items or characters used in a game with another player, and to perform operations comprising:
    setting a place in a virtual world designated by a player via a user interface including a display device, according to an operation input;
    designating an item or character that the player is to transmit to the another information processing apparatus for the exchange, according to an operation input;
    in the exchange,
        transmitting, to the another information processing apparatus, information about the place in the virtual world designated by the player and information about the item or character designated by the player, as information about a thing to be exchanged, and
        receiving, from the another information processing apparatus, information about the place designated by an exchanging partner and information about the item or character designated by the exchanging partner, as information about a thing to be exchanged; and
    displaying, in the virtual world and via the user interface, at least one of the item or character that has been obtained as the thing to be exchanged from the exchanging partner either as a result of the exchange, or upon selecting the place.

2. The non-transitory computer-readable storage medium according to claim 1, wherein:
    the another information processing apparatus is a server configured to store at least one of the transmitted information about a thing to be exchanged, and
    the game program further causes the processor to perform operations comprising communicating with the server to execute the exchange with the another player through the server.

3. The non-transitory computer-readable storage medium according to claim 2, wherein the game program further causes the processor to perform operations comprising in the exchange, receiving, from the server, a most recently stored one of the information about a thing to be exchanged that is stored in the server, as information about a thing to be exchanged of the exchanging partner.

4. The non-transitory computer-readable storage medium according to claim 2, wherein the game program further causes the processor to perform operations comprising in the exchange, receiving, from the server, a randomly chosen one of the information about a thing to be exchanged that is stored in the server, as information about a thing to be exchanged of the exchanging partner.

5. The non-transitory computer-readable storage medium according to claim 2, wherein the game program further causes the processor to perform operations comprising in the exchange, receiving, from the server, one of the information about a thing to be exchanged that is stored in the server, a place designated for the one being the same as the place designated by the player, as information about a thing to be exchanged of the exchanging partner.

6. The non-transitory computer-readable storage medium according to claim 2, wherein the game program further causes the processor to perform operations comprising displaying each item or character that is stored as the information about a thing to be exchanged in the server and that has not yet been exchanged at the respective place designated on the user interface, based on at least one of the information about a thing to be exchanged that is stored in the server.

7. The non-transitory computer-readable storage medium according to claim 1, wherein the game program further causes the processor to perform operations comprising giving a reward to the player in the game, based on the number of the places designated by the exchanging partner where the exchange has been done.

8. The non-transitory computer-readable storage medium according to claim 1, wherein:
the user interface includes a spherical user interface representing the earth in a virtual space, and
the game program further causes the processor to perform operations comprising setting a place designated by the player on the earth according to an operation input.

9. The non-transitory computer-readable storage medium according to claim 1, wherein;
the user interface includes a spherical user interface representing the earth in a virtual space, and
the game program further causes the processor to perform operations comprising setting a place designated by the player specifying coordinates on the spherical user interface, according to an operation input.

10. The non-transitory computer-readable storage medium according to claim 8, wherein the game program further causes the processor to perform operations comprising rotating the spherical user interface in a virtual space according to an operation input.

11. The non-transitory computer-readable storage medium according to claim 1, wherein:
the user interface includes a map, and
the game program further causes the processor to perform operations comprising setting a place designated by the player choosing an area on the map, according to an operation input.

12. A game system including an information processing apparatus having a processor, and another information processing apparatus, wherein the information processing apparatus and the another information processing apparatus are configured to communicate with each other to exchange items or characters used in a game with another player, and the processor is configured to at least:
set a place in a virtual world designated by a player via a user interface including a display device, according to an operation input;
designate an item or character that the player is to transmit to the another information processing apparatus for the exchange, according to an operation input;
in the exchange,
transmit, to the another information processing apparatus, information about the place in the virtual world designated by the player and information about the item or character designated by the player, as information about a thing to be exchanged, and
receive, from the another information processing apparatus, information about the place designated by an exchanging partner and information about the item or character designated by the exchanging partner, as information about a thing to be exchanged; and
display, in the virtual world and via the user interface, at least one of the item or character that has been obtained as the thing to be exchanged from the exchanging partner either as a result of the exchange, or upon selecting the place.

13. The game system according to claim 12, wherein the another information processing apparatus is a server configured to store at least one of the transmitted information about a thing to be exchanged.

14. The game system according to claim 13, wherein the server is further configured to, in the exchange, transmit the information about a thing to be exchanged that has been most recently stored in the server to the information processing apparatus, and newly store the information about a thing to be exchanged that is transmitted from the information processing apparatus.

15. The game system according to claim 14, wherein the server is further configured to, in the exchange, transmit the information about a thing to be exchanged that has been most recently stored in the server to the information processing apparatus, and delete therefrom the information about a thing to be exchanged that has been most recently stored in the server.

16. The game system according to claim 13, wherein the processor or the server is further configured to, in the exchange, randomly choose the information about a thing to be exchanged of the exchanging partner from the information about a thing to be exchanged that is stored in the server, and cause the information processing apparatus to receive the information about a thing to be exchanged of the exchanging partner.

17. The game system according to claim 13, wherein the processor or the server is further configured to, in the exchange, choose one of the information about a thing to be exchanged that is stored in the server, a place designated for the one being the same as the place designated by the player, as information about a thing to be exchanged of the exchanging partner, and cause the information processing apparatus to receive the one of the information about a thing to be exchanged that is stored in the server.

18. The game system according to claim 13, wherein the processor is further configured to display each item or character that is stored as the information about a thing to be exchanged in the server and that has not yet been exchanged at the respective place designated on the user interface, based on at least one of the information about a thing to be exchanged that is stored in the server.

19. The game system according to claim 12, wherein the processor is further configured to give a reward to the player in the game, based on the number of the places designated by the exchanging partner where the exchange has been done.

20. The game system according to claim 12, wherein:
the user interface includes a spherical user interface representing the earth in a virtual space, and
the processor is further configured to set a place designated by the player on the earth according to an operation input.

21. The game system according to claim 12, wherein:
the user interface includes a spherical user interface representing the earth in a virtual space, and
the processor is further configured to set a place designated by the player specifying coordinates on the spherical user interface, according to an operation input.

22. The game system according to claim 20, wherein the processor is further configured to rotate the spherical user interface in a virtual space according to an operation input.

23. The game system according to claim 12, wherein;
the user interface includes a map, and
the processor is further configured to set a place designated by the player choosing an area on the map, according to an operation input.

24. A game apparatus including a processor, wherein the game apparatus is configured to communicate with another information processing apparatus to exchange items or characters used in a game with another player, and the processor is configured to at least:
- set a place in a virtual world designated by a player on a user interface including a display device, according to an operation input;
- designate an item or character that the player is to transmit to the another information processing apparatus for the exchange, according to an operation input;
- in the exchange,
  - transmit, to the another information processing apparatus, information about the place in the virtual world designated by the player and information about the item or character designated by the player, as information about a thing to be exchanged, and
  - receive, from the another information processing apparatus, information about the place designated by an exchanging partner and information about the item or character designated by the exchanging partner, as information about a thing to be exchanged; and
- display, in the virtual world and via the user interface, at least one of the item or character that has been obtained as the thing to be exchanged from the exchanging partner either as a result of the exchange, or upon selecting the place.

25. The game apparatus according to claim 24, wherein:
- the another information processing apparatus is a server configured to store at least one of the transmitted information about a thing to be exchanged, and
- the processor is further configured to perform the exchange with the another player through the server by communication with the server.

26. The game apparatus according to claim 25, wherein the processor is further configured to in the exchange, cause the game apparatus to receive, from the server, a most recently stored one of the information about a thing to be exchanged that is stored in the server, as information about a thing to be exchanged of the exchanging partner.

27. The game apparatus according to claim 25, wherein the processor is further configured to in the exchange, cause the game apparatus to receive, from the server, a randomly chosen one of the information about a thing to be exchanged that is stored in the server, as information about a thing to be exchanged of the exchanging partner.

28. The game apparatus according to claim 25, wherein the processor is further configured to in the exchange, cause the game apparatus to receive, from the server, one of the information about a thing to be exchanged that is stored in the server, a place designated for the one being the same as the place designated by the player, as information about a thing to be exchanged of the exchanging partner.

29. The game apparatus according to claim 25, wherein the processor is further configured to display each item or character that is stored as the information about a thing to be exchanged in the server and that has not yet been exchanged at the respective place designated on the user interface, based on at least one of the information about a thing to be exchanged that is stored in the server.

30. The game apparatus according to claim 24, wherein the processor is further configured to give a reward to the player in the game, based on the number of the places designated by the exchanging partner where the exchange has been done.

31. The game apparatus according to claim 24, wherein:
- the user interface includes a spherical user interface representing the earth in a virtual space, and
- the processor is further configured to set a place designated by the player on the earth according to an operation input.

32. A game processing method for causing a processor of an information processing apparatus to communicate with another information processing apparatus to exchange items or characters used in a game with another player, the method comprising:
- setting place designated in a virtual world by a player on a user interface including a display device, according to an operation input;
- designating an item or character that the player is to transmit to the another information processing apparatus for the exchange, according to an operation input;
- in the exchange,
  - transmitting, to the another information processing apparatus, information about the place in the virtual world designated by the player and information about the item or character designated by the player, as information about a thing to be exchanged, and
  - receiving, from the another information processing apparatus, information about the place designated by an exchanging partner and information about the item or character designated by the exchanging partner, as information about a thing to be exchanged; and
- displaying, in the virtual world and via the user interface, at least one of the item or character that has been obtained as the thing to be exchanged from the exchanging partner either as a result of the exchange, or upon selecting the place.

33. The game processing method according to claim 32, wherein
- the another information processing apparatus is a server configured to store at least one of the transmitted information about a thing to be exchanged, and
- the game processing method further comprises communicating with the server to execute the exchange with the another player through the server.

34. The game processing method according to claim 33, further comprising, in the exchange, causing the information processing apparatus to receive a most recently stored one of the information about a thing to be exchanged that is stored in the server.

35. The game processing method according to claim 33, further comprising, in the exchange, randomly choosing the information about a thing to be exchanged of the exchanging partner from the information about a thing to be exchanged that is stored in the server, and causing the information processing apparatus to receive the information about a thing to be exchanged of the exchanging partner.

36. The game processing method according to claim 33, further comprising, in the exchange, choosing one of the information about a thing to be exchanged that is stored in the server, a place designated for the one being the same as the place designated by the player, as information about a thing to be exchanged of the exchanging partner, and causing the information processing apparatus to receive the one of the information about a thing to be exchanged that is stored in the server.

37. The game processing method according to claim 33, further comprising displaying each item or character that is stored as the information about a thing to be exchanged in the server and that has not yet been exchanged at the respective place designated on the user interface, based on at least one of the information about a thing to be exchanged that is stored in the server.

38. The game processing method according to claim 32, further comprising giving a reward to the player in the game, based on the number of the places designated by the exchanging partner where the exchange has been done.

39. The game processing method according to claim 32, wherein:
- the user interface includes a spherical user interface representing the earth in a virtual space, and
- the game processing method further comprises setting a place designated by the player on the earth according to an operation input.

* * * * *